(12) United States Patent
Pathak et al.

(10) Patent No.: US 12,140,247 B2
(45) Date of Patent: Nov. 12, 2024

(54) ELECTRICAL ACTUATOR

(71) Applicant: OneSubsea IP UK Limited, London (GB)

(72) Inventors: Parth Dilip Pathak, Cypress, TX (US); Federico Davila, Houston, TX (US); Augusto Arcelaschi, Houston, TX (US)

(73) Assignee: OneSubsea IP UK Limited, London (GB)

( * ) Notice: Subject to any disclaimer, the term of this patent is extended or adjusted under 35 U.S.C. 154(b) by 1 day.

(21) Appl. No.: 18/255,945

(22) PCT Filed: Dec. 3, 2021

(86) PCT No.: PCT/US2021/061732
§ 371 (c)(1),
(2) Date: Jun. 5, 2023

(87) PCT Pub. No.: WO2022/120123
PCT Pub. Date: Jun. 9, 2022

(65) Prior Publication Data
US 2024/0044417 A1    Feb. 8, 2024

Related U.S. Application Data

(60) Provisional application No. 63/199,032, filed on Dec. 3, 2020.

(51) Int. Cl.
*F16K 31/50* (2006.01)
*F16H 25/20* (2006.01)
(Continued)

(52) U.S. Cl.
CPC ......... *F16K 31/508* (2013.01); *F16H 25/205* (2013.01); *F16H 25/2454* (2013.01);
(Continued)

(58) Field of Classification Search
CPC .. F16K 31/508; F16H 25/205; F16H 25/2454; F16H 2025/2072;
(Continued)

(56) References Cited

U.S. PATENT DOCUMENTS 4,616,528 A * 10/1986 Malinski ................. F16K 31/05
                                                            475/263
9,163,484 B2 * 10/2015 Biester .................. F16K 31/048
(Continued)

FOREIGN PATENT DOCUMENTS

WO    WO-2019141595 A1 * 7/2019 ............. E21B 34/02

OTHER PUBLICATIONS

Extended European Search Report issued in European Patent Appl. No. 21901500.5 on Oct. 2, 2024; 8 pages.

*Primary Examiner* — Jessica Cahill
(74) *Attorney, Agent, or Firm* — Jeffrey D. Frantz

(57) ABSTRACT

A system includes an electric actuator having an actuation stem, a screw assembly, an electric drive, and a lock. The screw assembly is coupled to the actuation stem, wherein the screw assembly includes a male screw portion coupled to a female screw portion. The electric drive is coupled to the screw assembly, wherein the electric drive is configured to move the screw assembly to move the actuation stem. The lock is configured to hold a position of the actuation stem when not driving movement of the actuation stem.

20 Claims, 15 Drawing Sheets

(51) Int. Cl.
*F16H 25/24* (2006.01)
*H01F 7/08* (2006.01)

(52) U.S. Cl.
CPC ..... *H01F 7/081* (2013.01); *F16H 2025/2075* (2013.01); *F16H 2025/2081* (2013.01); *F16H 2025/2087* (2013.01); *F16H 2025/209* (2013.01); *F16H 2025/2093* (2013.01)

(58) Field of Classification Search
CPC ..... F16H 2025/2081; F16H 2025/2087; F16H 2025/209; F16H 225/2093; H01F 7/081
See application file for complete search history.

(56) References Cited

U.S. PATENT DOCUMENTS

| | | | |
|---|---|---|---|
| 9,816,592 B1 * | 11/2017 | Glikin | F16H 25/2021 |
| 10,295,079 B2 * | 5/2019 | Dordoni | F16K 31/5286 |
| 2006/0243936 A1 * | 11/2006 | Hoang | F16K 3/0254 |
| | | | 251/63 |
| 2015/0152971 A1 * | 6/2015 | Lenz | F16K 31/047 |
| | | | 251/129.11 |
| 2015/0369001 A1 * | 12/2015 | Hoang | F16K 31/04 |
| | | | 166/66.4 |
| 2016/0298789 A1 | 10/2016 | Dubus et al. | |
| 2021/0363857 A1 * | 11/2021 | Tandberg | F16K 3/0254 |

\* cited by examiner

ELECTRICAL ACTUATOR

CROSS REFERENCE TO RELATED APPLICATION

This application is the National Stage Entry of International Application No. PCT/US2021/061732, filed Dec. 3, 2021, which claims priority from and the benefit of U.S. Provisional Application No. 63/199,032, entitled "Electric Actuator," filed Dec. 3, 2020, which is hereby incorporated by reference in its entirety.

BACKGROUND

The present disclosure relates generally to an electrical actuator for a valve, such as a gate valve.

For subsea applications, hydrocarbon fluids such as oil and natural gas are obtained from a subterranean geologic formation, referred to as a reservoir, by drilling a well through a subsea wellhead system that penetrates the hydrocarbon-bearing geologic formation.

In subsea applications, various types of infrastructure may be positioned along a sea floor and coupled by electrical lines. There is a tendency to equip subsea trees with electric actuators. Traditionally, most of the subsea production systems use hydraulic fluids for operating the subsea valves on subsea trees. Known actuators rely on a spring to automatically close the valve. If a mechanical override is required, the override is achieved with tools that provide a mechanical push to open the valves. Unfortunately, when the spring system is utilized, the push force required to open the valve is increased because of the need to compress the spring.

It would thus be helpful to provide an electric actuator enabling an emergency closure of a valve through a battery system and eliminating the spring return system, which is used in known actuators. When the spring is removed, the force from the override mechanism is only required to overcome the actual valve opening, which can be further tuned to provide reduced power at various stages of the valve opening.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

In embodiments of the disclosure, an electric actuator is proposed for a valve including an actuator mechanism enabling an emergency mechanical operation of the valve. In embodiments of the disclosure, the electric actuator includes a screw mechanism, a gear train, a self-locking mechanism, and motor.

In embodiments of the disclosure, the electric actuator includes a motor powered by a battery system and coupled through a gear train to a screw mechanism, which then provides a linear output to a valve stem actuating a valve open or close. In certain embodiments, the electric actuator further includes a self-locking mechanism. When the power is not provided, the self-locking mechanism enables the actuator mechanism to fail in as-is position. In certain embodiments, the self-locking mechanism includes an electromagnetic brake or a worm screw. In certain embodiments, the electric actuator further includes a manual tool, which mechanically overrides the self-locking mechanism. In certain embodiments, the manual tool provides torque to the worm screw, which then operates the valve stem.

In embodiments of the disclosure, a system includes an electric actuator having an actuation stem, a screw assembly, an electric drive, and a lock. The screw assembly is coupled to the actuation stem, wherein the screw assembly includes a male screw portion coupled to a female screw portion. The electric drive is coupled to the screw assembly, wherein the electric drive is configured to move the screw assembly to move the actuation stem. The lock is configured to hold a position of the actuation stem when not driving movement of the actuation stem.

In embodiments of the disclosure, a method includes powering an electric drive to move a screw assembly to move an actuation stem of an electric actuator, wherein the screw assembly includes a male screw portion coupled to a female screw portion, and the screw assembly is coupled to the actuation stem. The method also includes holding, via a lock, a position of the actuation stem when not driving movement of the actuation stem.

In embodiments of the disclosure, a system includes a valve assembly having a valve disposed in a valve body, and an electric actuator including an actuation stem, a screw assembly, an electric drive, a lock, and an override. The actuation stem is coupled to the valve. The screw assembly is coupled to the actuation stem, wherein the screw assembly includes a male screw portion coupled to a female screw portion. The electric drive is coupled to the screw assembly, wherein the electric drive is configured to move the screw assembly to move the actuation stem. The lock is configured to hold a position of the actuation stem when not driving movement of the actuation stem. The override is coupled to the screw assembly, wherein the override is configured to enable an override of the lock to move the screw assembly without the electric drive, and the override includes a remotely operated vehicle (ROV) override.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
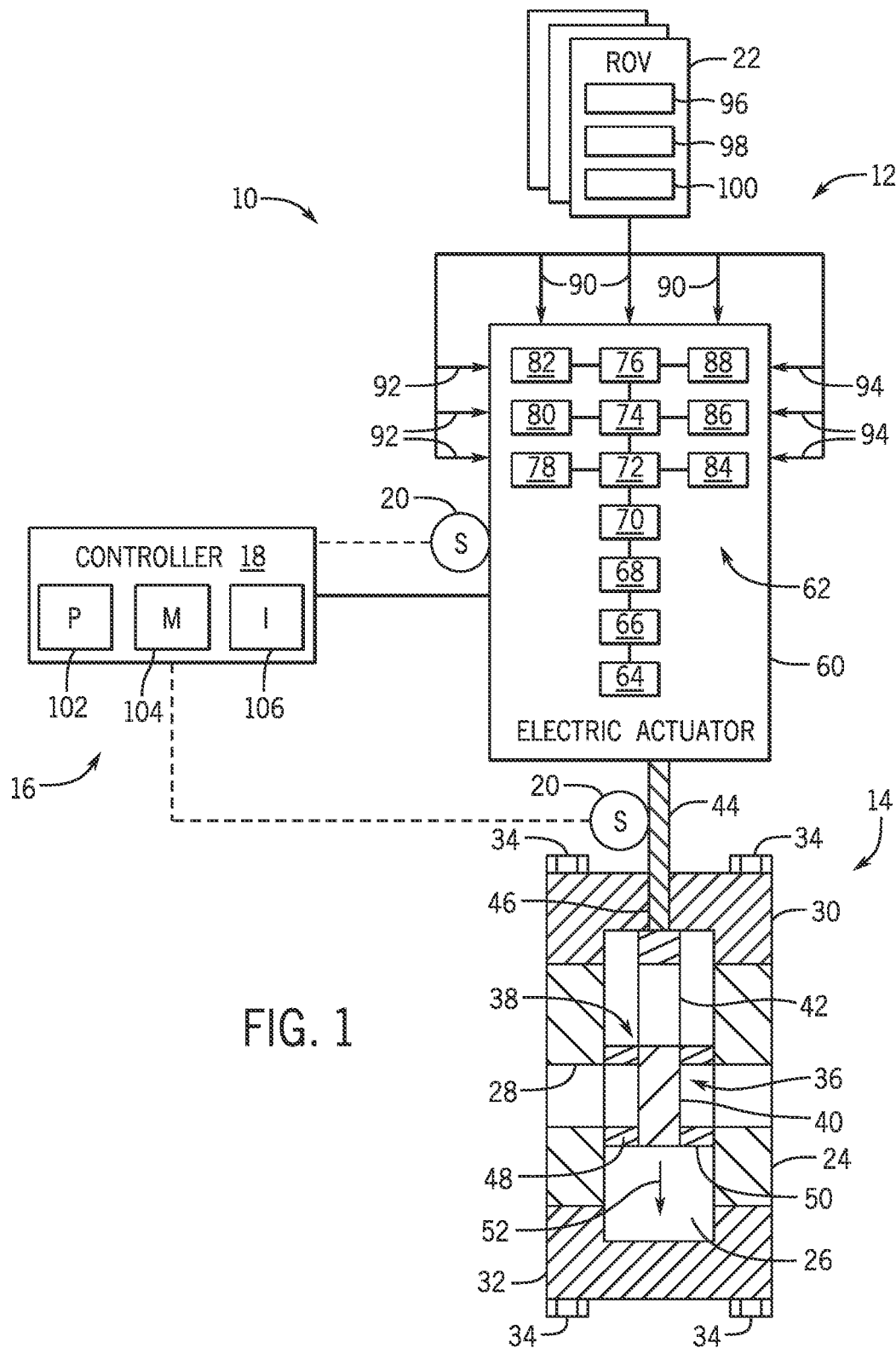
FIG. 1 is a block diagram of an embodiment of a fluid flow control system having an electric actuation system coupled to a valve assembly.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ." The articles "a," "an," "the," and "said" are intended to mean that there are one or more of the elements. Any use of any form of the terms "connect," "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

In certain embodiments as discussed in detail below, an electric actuator is provided to overcome disadvantages of previous spring-biased actuators. For example, in certain embodiments, an electric actuator for a valve may include a gate valve assembly, wherein a gate of the gate valve assembly is coupled to a valve stem. The valve stem may be coupled to an actuator mechanism, which provides a linear motion. In certain embodiments, the actuator mechanism may include the following elements: a high efficiency screw mechanism (e.g., a roller screw or a ball screw), a gear train, a motor, and a brake. Bearings also may be provided at the screw mechanism to withstand thrust and torsional loads. When no electric power is provided to the actuator, the brake mechanism engages with the motor, and ensures no rotary motion is allowed to the motor or the roller nut and hence locks the stem in position. When electric power is provided, the brake disengages, and the motor spins engaging the roller screw nut via the gear drive. As the roller nut rotates, the roller stem translates linearly, which transfers motion to the valve stem to actuate valve, either open or close based on direction of the motor spinning. In embodiments, it may also be possible to apply electric input to disengage the brake and then apply torque using a mechanical tool. When no electric power is provided or available, embodiments of the disclosure include a mechanical override via a torque bucket, for example a torque bucket provided for a remotely operated vehicle (ROV). In embodiments, two levers in the ROV bucket are pushed down by the ROV tool, which disengages the brake. Once the brake is disengaged, the ROV tool can provide the torque that is conveyed to the roller nut via the motor and gear train. The roller stem then may translate moving the valve stem, which either opens or closes the valve, based on direction of the rotation.

Additionally, the disclosed embodiments may include an electric actuator mechanism having a screw mechanism, a gear train, a self-locking mechanism, and a motor. The screw mechanism may include a roller screw or a ball screw. Instead of or in addition to the electromagnetic brake mechanism, a self-locking worm gear mechanism or any self-locking mechanism that prevents back drive might be utilized in the electric actuator mechanism. When power is supplied to the motor, the motor provides torque, which is reduced by the worm gear and applied to the ball screw nut. The ball screw stem translates, moving the valve stem and thus opening or closing the valve, based on the direction the motor spins. The worm gear mechanism (or self-locking mechanism that prevents the back drive) enables to ensure that the valve fails in position and that the ball screw stem does not move due to its self-locking feature. To mechanically override the valve, sufficient torque may be provided through the torque bucket, which via a gear train (or directly to the worm gear mechanism) is transferred to the worm gear and then ball screw mechanism to eventually open/close the valve.

In certain embodiments, different methods may be utilized for the screw mechanisms, such as trapezoidal threads (acme threads) and/or worm screw threads that can provide self-locking feature as well. Different methods could be utilized for the brake mechanism as well, such as self-locking gears or threads or magnetic or mechanical brakes. In certain embodiments, visual indication of the valve in open or close position might also be provided. Such visualization may be provided on the ROV bucket and the mechanism that connects to the valve stem. With the foregoing in mind, the following discussion presents embodiments of an electric actuator as illustrated in FIGS. 1-15. The features and components discussed in detail below are intended for use in combination with one another, and like element numbers are used to reference components having the same functionality in the drawings.

FIG. 1 is a block diagram of an embodiment of a fluid flow control system 10 having an electric actuation system 12 coupled to a valve assembly 14, such as a gate valve assembly or a ball valve assembly. The fluid flow control system 10 also includes a control system 16 having one or more controllers 18 configured to control operation of the electric actuation system 12. The control system 16 includes one or more sensors 20 coupled to the electric actuation system 12 and the valve assembly 14. Each of the sensors 20 is configured to provide feedback to the controller 18 regarding a position of the electric actuation system 12 and/or the valve assembly 14. The fluid flow control system 10 also includes one or more remotely operated vehicles (ROV) 22 (e.g., a subsea or underwater ROV having one or more ROV tools) configured to retrieve one or more components of the electric actuation system 12 and/or operate or override one or more components of the electric actuation system 12. As discussed in further detail below, the electric actuation system 12 is configured to operate the valve assembly 14 with electricity from an energy storage unit, such as one or more batteries, during operation of the fluid flow control system 10. The energy storage unit may be charged by another power supply, such as a power grid, a solar panel, an electric generator, or a combination thereof. In certain embodiments, the electric actuation system 12 generally excludes a spring to bias the valve assembly 14 to a particular position, such as an open or closed position, in response to various events, such as an emergency situation. Instead, the electric actuation system 12 uses electricity (e.g., one or more electric drives) to drive movement of the valve assembly 14 over all ranges of movement in directions toward both the open and closed positions in various conditions, including normal operation and emergency situations. Advantageously, as the electric actuation system 12 may exclude springs to bias the valve assembly 14, the electric actuation system 12 may experience less resistance to movement of the valve assembly 14 in certain directions, such as during emergency situations.

The valve assembly 14 includes a valve body 24 having a valve chamber 26 and a fluid passage or bore 28 extending through the valve body 24 in fluid communication with the valve chamber 26. The valve assembly 14 also includes one or more valve bonnets, such as valve bonnets 30 and 32, coupled to the valve body 24 via a plurality of threaded fasteners 34. The valve body 24 and the valve bonnets 30 and 32 collectively define the valve chamber 26, which is configured to house a valve 36, such as a gate valve, for movement between open and closed positions relative to the fluid passage 28. In the illustrated embodiment, the valve 36 includes a gate 38 having a solid gate portion 40 and a valve opening 42. The gate 38 in turn is coupled to a valve stem 44, which extends through a stem bore 46 in the valve bonnet 30. The gate 38 moves axially along an axis of the valve stem 44 along opposite valve seats 48 and 50 disposed between the gate 38 and opposite interior surfaces of the valve body 24. As illustrated, the valve assembly 14 is configured in a closed position, wherein the solid gate portion 40 is aligned with the fluid passage 28 and seals against the valve seats 48 and 50. During operation of the electric actuation system 12, the valve stem 44 moves axially along its central axis to move the gate 38 in a direction indicated by arrow 52, thereby positioning the valve opening 42 in line with the fluid passage 28 while the valve seats 48 and 50 are sealed about the valve opening 42. In this position, the valve assembly 14 is configured to enable fluid flow through the fluid passage 28 and the valve opening 42 in the gate 38. The valve assembly 14 is configured to move between the open and closed positions by moving the valve stem 44 with the electric actuation system 12.

The electric actuation system 12 includes an electric actuator 60 having a plurality of actuator components 62 disposed in one or more series arrangements, parallel arrangements, or a combination thereof. For example, the actuator component 62 may include actuator components 64, 66, 68, 70, 72, 74, 76, 78, 80, 82, 84, 86, and 88. These actuator components 62 may include one or more high efficiency screw assemblies (e.g., roller screw assemblies, ball screw assemblies, etc.), one or more gear trains or gear assemblies, one or more electric drives or motors, one or more brakes or locks, one or more ROV overrides, one or more energy storage units, one or more power supplies, or any combination thereof. For example, the one or more gear assemblies of the actuator component 62 may include a plurality of gears (e.g., planetary gear assemblies, bevel gear assemblies, worm screw and gear assemblies, etc.) engaged with one another to provide a mechanical advantage for operating the valve assembly 14. The one or more electric drives or motors of the actuator component 62 may be powered by energy storage units, such as batteries or capacitors, to operate the valve assembly 14. The one or more brakes or locks of the actuator component 62 may be configured to engage first and second lock portions to lock a position of the valve assembly and the electric actuator 60 in response to a loss of power, a control signal, a completed movement of the valve assembly 14, or any combination thereof. The one or more brakes or locks may also be self-locking, such as self-locking brakes configured to automatically lock and secure the position of the valve assembly. The one or more brakes or locks also may use a mechanical advantage of a gear assembly (e.g., a worm screw and gear assembly and/or a trapezoidal thread screw) to lock a position of the valve assembly 14 and the electric actuator 60 (e.g., gear assembly includes a self-locking mechanism, self-locking gear assembly, or self-locking brake). The energy storage units may include one or more batteries, which may be charged by an electric source or power supply. The batteries or energy storage units generally power the electric drives during operation. However, if the power fails, then the electric actuator 60 may lock the position of the valve assembly 14 and the electric actuator 60 via one or more brakes or locks. In the illustrated embodiment, the actuator components 64, 66, 68, and 70 may include a screw assembly, one or more gear assemblies, one or more electric drives, and one or more brakes or locks.

The actuator components 72, 74, 76, 78, 80, 82, 84, 86, and 88 may include one or more electric drives that are retrievable by the ROV 22, one or more ROV override mechanisms configured to operate the electric actuator 60 if the electric drive is inoperable, or various other components to enable normal or override operation of the electric actuator 60 and the valve assembly 14. The ROV 22 may be configured to operate and or retrieve the various actuator component 62 in a variety of directions as indicated by arrows 90, 92, and 94. In particular, the ROV 22 may be configured to retrieve and/or operate one or more of the actuator component 62 (e.g., energy storage units, electric drives or motors, gear assemblies, locks or brakes, etc.) in an axial direction along an axis of the valve stem 44 as indicated by arrows 90, or the ROV 22 may be configured to retrieve and/or actuate one or more of the actuator component 62 in a lateral direction relative to the axis of the valve stem 44 as indicated by arrows 92 and 94. In the illustrated embodiment, the ROVs 22 may include one or more drives 96, energy storage units 98, and controllers 100. The drives 96 may include electric drives or motors, fluid drives or motors, or any combination thereof. For example, the fluid drives or motors may include hydraulic and/or pneumatic drives or motors. The energy storage units 98 may include one or more batteries, capacitors, such as super capacitors, or other energy storage devices. The controller 100 may include a processor, memory, and instructions stored on the memory and executable by the processor to operate functions of the ROV 22. For example, the controller 100 may control the drives 96 to operate an axial movement of an ROV actuator, a rotational movement of an ROV actuator, or some other movement of the ROV 22.

As discussed above, the control system 16 includes one or more controllers 18 and one or more sensors 20 coupled to the electric actuation system 12 and the valve assembly 14. In the illustrated embodiment, the sensors 20 may be coupled to the valve stem 44 and one or more of the actuator components 62 to monitor a position of the valve stem 44 and/or the actuator components 62. For example, the monitored position may correspond to a rotational position, an axial position, or a combination thereof that indicates a position of the gate 38 of the valve assembly 14, such as a relative position between the open and closed positions. The illustrated controller 18 includes one or more processors 102, memory 104, and instructions 106 stored on the memory 104 and executable by the processors 102 to perform various functions of the electric actuation system 12. For example, the controller 18 may receive and process sensor feedback from the one or more sensors 22, and then control the electric actuation system 12 to move a position of the gate 38 and/or lock a position of the gate 38. For example, the controller 18 may be configured to control or operate the electric drive and/or energy storage unit to enable movements of the gate 38 between the open and closed positions, or the controller 18 may provide power or cut power to one or more locks or brakes, such that the electric actuator 60 is either secured in position or is able to move between positions to control the valve assembly 14. In certain embodiments, the controller 18 may control the electric actuator 60 to secure the position of the gate 38 and/or move the gate 38 to an open position or a closed position in response to sensor feedback from the sensors 20. Again, the electric actuator 60 operates with one or more electric drives using electricity from one or more energy storage units (e.g., batteries), such that the electric actuator 60 is able to operate with or without a power supply (e.g., power grid).

Figure 2:
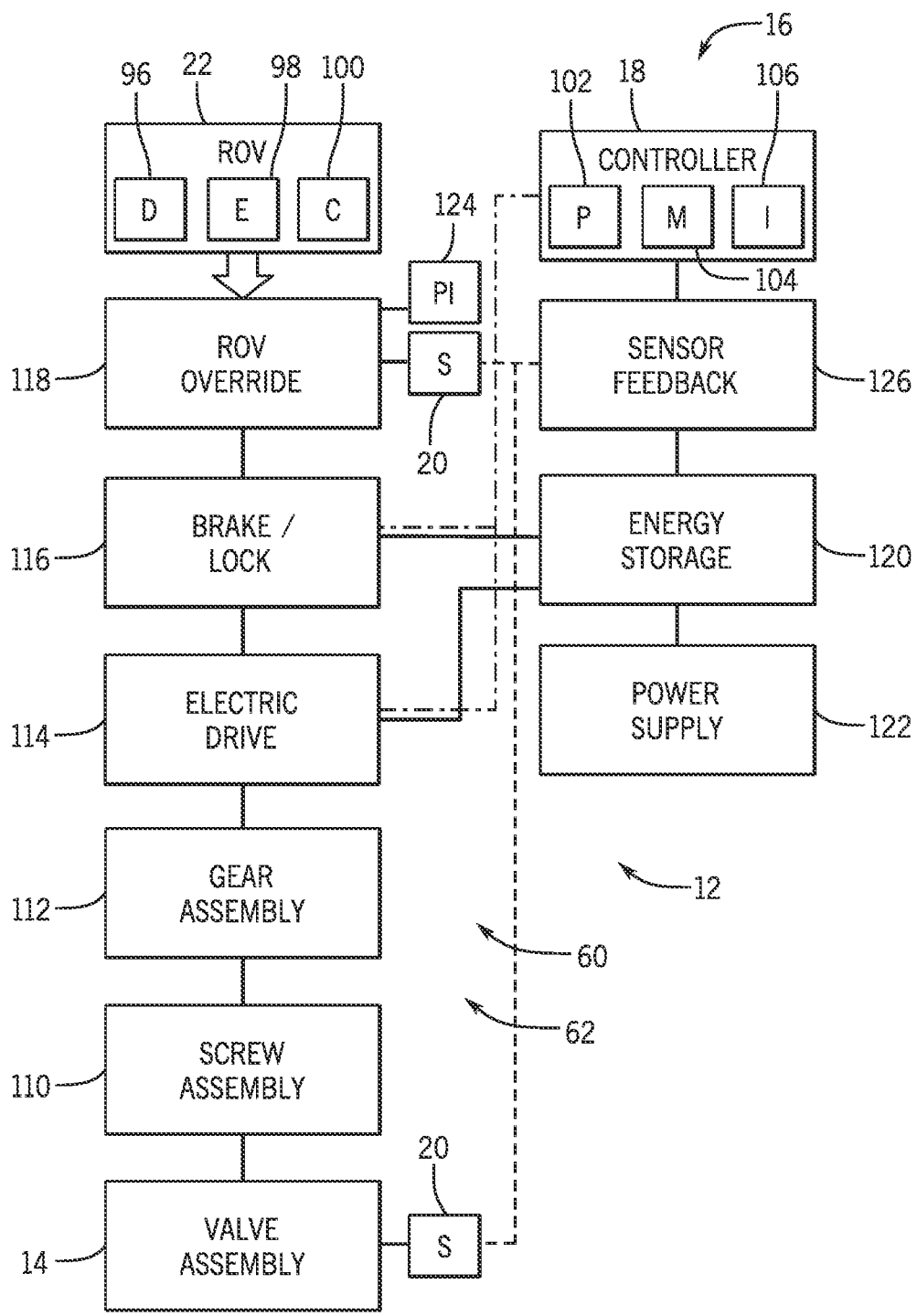
FIG. 2 is a block diagram of an embodiment of the fluid flow control system of FIG. 1, illustrating an electric actuator of the electric actuation system having a series arrangement of a screw assembly, a gear assembly, an electric drive, a brake or lock, and an override.

FIGS. 2-6 are block diagrams of embodiments of the fluid flow control system 10 of FIG. 1, further illustrating embodiments of the electric actuation system 12 having various configurations of the actuator components 62, the ROVs 22, and the sensors 20. As illustrated in FIG. 2, the electric actuator 60 of the electric actuation system 12 has a series arrangement of actuator component 62, including a screw assembly 110, a gear assembly 112, an electric drive 114, a brake or lock 116, and an ROV override 118. The ROV override 118 is configured to interface with the ROV 22 to override operation of the electric actuator 60 otherwise driven by the electric drive 114. The electric actuation system 12 also includes one or more energy storage units 120, such as batteries or supercapacitors, electrically coupled to the electric drive 114 and the brake or lock 116. The energy storage unit 120 is also electrically coupled to a power supply 122, which may include an electrical connection with a power grid, an electric generator (e.g., an engine driven generator, a hydro turbine generator, or a wind turbine generator), a solar powered system, or any combination thereof. During normal (non-override) operation, the electric drive 114 is configured to apply a driving force (e.g., a torque) to drive the gear assembly 112, which provides a mechanical advantage to drive the gear assembly 112. The gear assembly 112 in turn converts the driving force (e.g., torque) into an actuation force (e.g., a linear force) to drive the valve assembly 14, such as by linearly moving the gate 38 between the open and closed positions. The brake or lock 116 may be disengaged to enable movement by the electric drive 114 during a normal actuation process, and then reengaged to disable movement by the electric drive 114 after the valve assembly 14 is moved to the desired position.

In the illustrated embodiment, the screw assembly 110 may include a male threaded shaft coupled with a female threaded nut, such that rotational movement may be converted into linear movement of the valve assembly 14 or vice versa. The screw assembly 110 may include a roller screw mechanism having a plurality of rollers, a ball screw mechanism having a plurality of balls, or any other suitable low friction elements or bearings along the threaded connection between male and female threaded members. The gear assembly 112 may include a plurality of gears coupled together to provide a mechanical advantage between the electric drive 114 and the screw assembly 110. For example, the gear assembly 112 may include one or more planetary gear assemblies, bevel gear assemblies, or gear trains having multiple gears with different numbers of teeth engaged with one another, thereby providing a gear ratio suitable to increase a mechanical advantage between the electric drive 114 and the screw assembly 110.

The brake or lock 116 may be configured to lock a position of the electric actuator 60 and the valve assembly 14, such that the current position of the valve assembly 14 is secured. In certain embodiments, the brake or lock 116 may be configured to secure a current position of the valve assembly 14, while some embodiments of the brake or lock may engage after the electric actuator 60 moves the valve assembly 14 to a close position or a closed position in response to an event (e.g., an emergency situation). The brake or lock 116 may include an electric driven lock, such as an electro-magnetic lock, a fluid driven lock, a mechanical lock such as a gear assembly that locks movement between the ROV override 118 and the electric drive 114, or any combination thereof. Each of the foregoing brakes or locks 116 may be self-locking (e.g., incorporating a self-locking mechanism or self-locking brake), such that the brakes or locks automatically block movement of the electric actuator 60 when not operating the electric drive 114 to move the valve assembly 14. In certain embodiments, the brake or lock 116 may be an electrical or electro-magnetic brake or lock, which unlocks or enables movement of the electric actuator 60 and the valve assembly 14 upon application of power from the energy storage unit 120. The brake or lock 116 may lock or block movement of the electric actuator 60 and the valve assembly 14 upon a loss of power from the energy storage unit 120. However, in other embodiments, the brake or lock 116 may operate in an opposite manner, such as blocking movement of the electric actuator 60 and the valve assembly 14 upon application of power from the energy storage unit 120 and unlocking or enabling movement of the electric actuator 60 and the valve assembly 14 upon a loss of power from the energy storage unit 120.

The ROV override 118 is an interface configured to receive the ROV 22, such that the ROV 22 can operate the electric actuation system 12 and the valve assembly 14 when the electric drive 114 is not operating or lacks power from the energy storage unit 120. For example, the ROV 22 may use one or more of the drives 96 to operate the brake or lock 116 to enable movement, and then use one or more of the drives 96 to apply a linear motion and/or a rotational motion to move the gear assembly 112, the screw assembly 110, and the valve assembly 114. In the illustrated embodiment, the controller 18 is coupled to sensors 20 disposed at the valve assembly 14 and the ROV override 118. The sensor 20 disposed at the valve assembly 14 may be configured to monitor a position of the valve stem 44 and/or the gate 38 as illustrated in FIG. 1. The sensor 20 disposed at the ROV override 118 may be configured to monitor a position and/or movement of the ROV 22 and the ROV override 118 that moves the gear assembly 112 and the screw assembly 110. Additionally, the ROV override 118 may include a position indicator 124, which may provide a visual indication of a position of the ROV 22, the ROV override 118, and the valve assembly 14. For example, the position indicator 124 may include an electronic display, a mechanical gauge, a marker that moves along a plurality of indicia, or any combination thereof, configure to indicate a relative position of the gate 38 between open and closed positions of the valve assembly 14.

As illustrated, the controller 18 receives sensor feedback 126 from the sensors 20 and the energy storage unit 120. For example, the sensor feedback 126 may include a position of the ROV override 118, a position of the gate 38 in the valve assembly 14, a charge state or power level of the energy storage unit 120, a power supply state of the power supply 122, or any combination thereof. The controller 18 is configured to use the sensor feedback 126 to control operation of the electric actuation system 12, such as an on or off state of the electric drive 114, a locked or unlocked state of the brake or lock 116, a position of the valve assembly 14 between open and closed positions, or any combination thereof. The sensor feedback 126 also may include other operational feedback, such as information about the fluid flowing through the valve assembly 14, environmental conditions, oil and gas equipment conditions, or any combination thereof. In the illustrated embodiment, the brake or lock 116 is disposed between the ROV override 118 and the electric drive 114. However, the electric actuator 60 may have other configurations of these components as discussed below.

Figure 3:
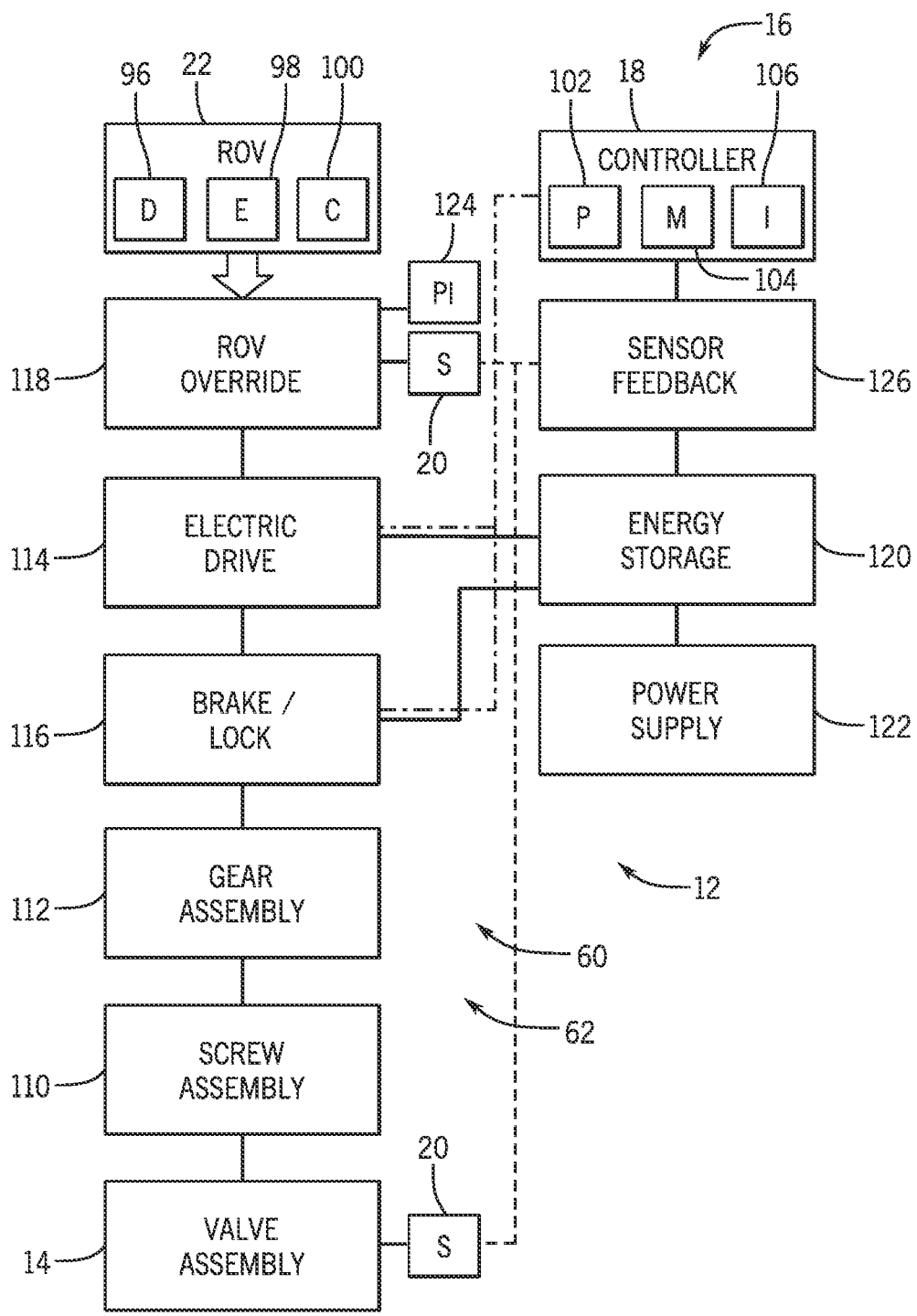
FIG. 3 is a block diagram of an embodiment of the fluid flow control system of FIG. 1, illustrating an electric actuator of the electric actuation system having a series arrangement of a screw assembly, a gear assembly, a brake or lock, an electric drive, and an override.

FIG. 3 is a block diagram of an embodiment of the fluid flow control system 10 of FIG. 1, further illustrating an embodiment of the electric actuation system 12 similar to the embodiment of FIG. 2 with a different configuration of the electric drive 114 and the brake or lock 116. All other aspects of the fluid flow control system 10 of FIG. 3 are the same as discussed above with reference to FIG. 2. However, in the illustrated embodiment, the electric drive 114 is swapped in position with the brake or lock 116. Accordingly, the electric actuator 60 has a series arrangement of the screw assembly 110, the gear assembly 112, the brake or lock 116, the electric drive 114, and the ROV override 118. In this configuration, the brake or lock 116 is disposed between the electric drive 114 and the gear assembly 112, thereby providing a positive lock or unlock between these components. The brake or lock 116 may have similar configurations or equipment as discussed above. For example, the brake or lock 116 may include an electric or electro-magnetic brake or lock, a fluid driven brake or lock, a mechanically driven brake or lock, or any combination thereof. The ROV override 118 is configured to engage or disengage the brake or lock 116 during an override procedure performed by the ROV 22. In certain embodiments, the ROV 22 may include one or more drives 96 to provide an axial movement to push one or more components of the brake or lock 116, or rotate one or more components of the brake or lock 116 to move between locked and unlocked positions. In some embodiments, the ROV 22 may provide electricity to operate the brake or lock 116 when power is unavailable from the energy storage unit 120.

Figure 4:
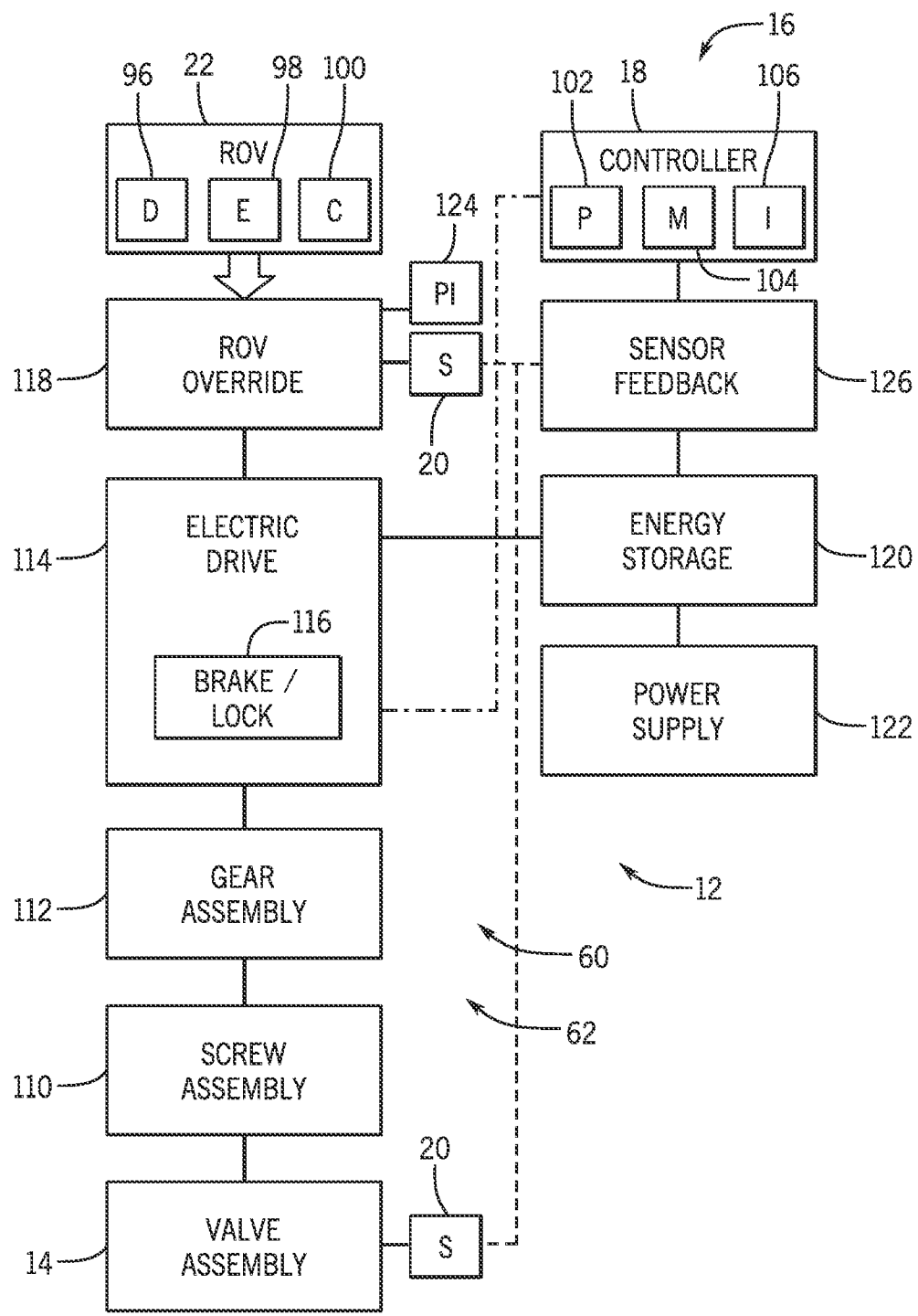
FIG. 4 is a block diagram of an embodiment of the fluid flow control system of FIG. 1, illustrating an electric actuator of the electric actuation system having a series arrangement of a screw assembly, a gear assembly, an electric drive having a brake or lock, and an override.

FIG. 4 is a block diagram of an embodiment of the fluid flow control system 10 of FIG. 1, further illustrating an embodiment of the electric actuation system 12 having a different configuration of the electric drive 114 and the brake or lock 116. Otherwise, the embodiment of FIG. 4 is the same as discussed in detail above with reference to FIG. 2. In the illustrated embodiment, the electric drive 114 has the brake or lock 116 integrated as a part of the electric drive 114. For example, the electric drive 114 itself may function as the electric drive to provide motion to move the valve assembly 14 via movement of the gear assembly 112 and the screw assembly 110, and the electric drive may function as a brake or lock 116 to block movement and hold the position of the gear assembly 112, the screw assembly 110, and the valve assembly 14. For example, the electric drive 116 may have an electric or electro-magnetic brake or lock 116 that unlocks upon application of electricity from the energy storage unit 120 to the electric drive 114, thereby unlocking the electric actuator 60 and also moving the electric actuator 60 substantially at the same time to operate the valve assembly 14. The electric drive 114 also may include other types of brakes or locks 116, such as mechanical brakes or locks, fluid driven brakes or locks, or any combination thereof. In some embodiments, the electric actuator 60 of FIG. 4 may include one or more separate brakes or locks 116 as illustrated in FIGS. 2 and 3, such as a brake or lock 116 disposed between the electric drive 114 and the ROV override 118 and/or between the electric drive 114 an the gear assembly 112. Accordingly, any combination of the electric drive 114 and the brake or lock 116 illustrated in FIGS. 2, 3, and 4 may be used in combination with one another.

Figure 5:
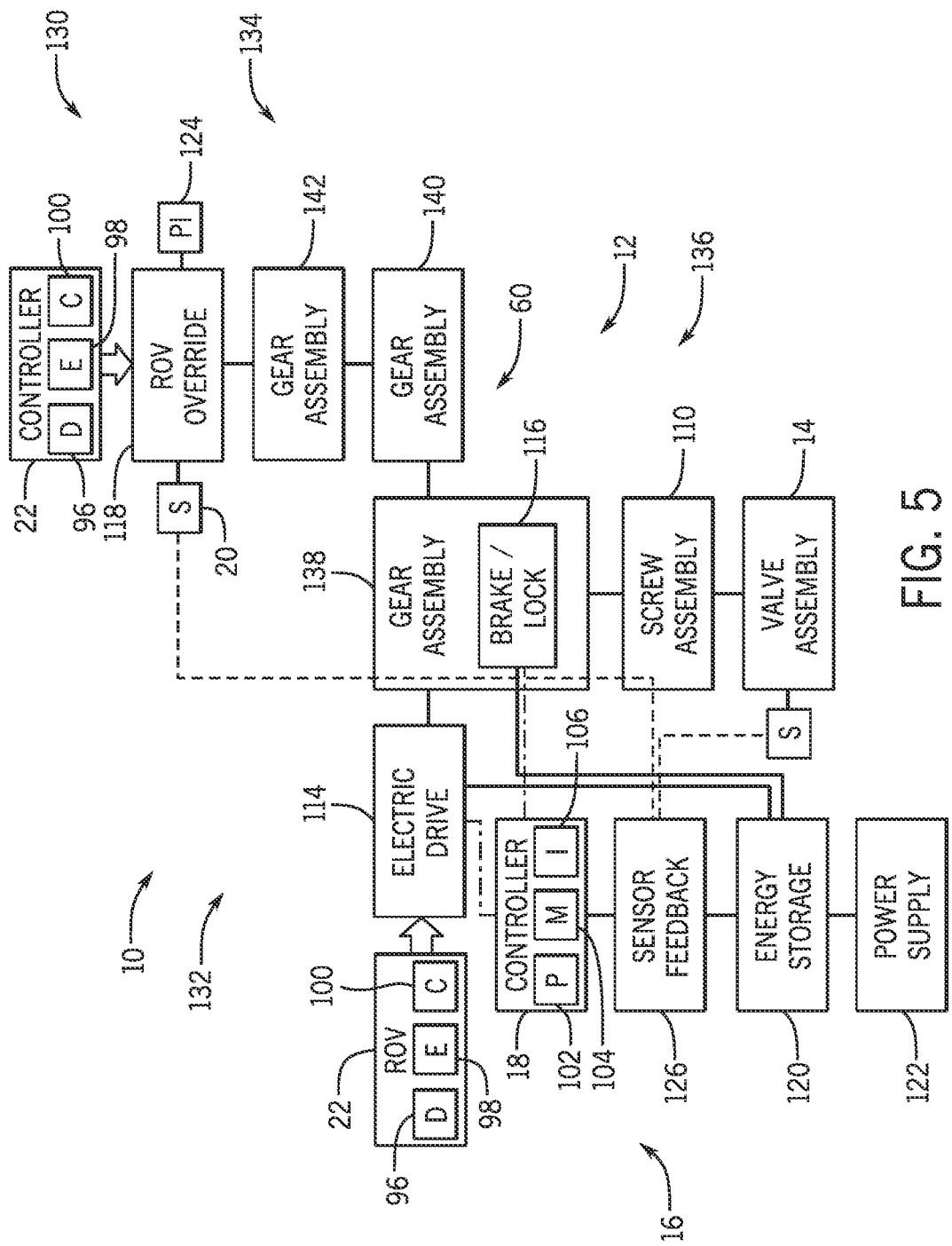
FIG. 5 is a block diagram of an embodiment of the fluid flow control system of FIG. 1, illustrating an electric actuator of the electric actuation system having a parallel configuration of first and second drives and a series configuration of a screw assembly and a gear assembly having a brake or lock.
Figure 6:
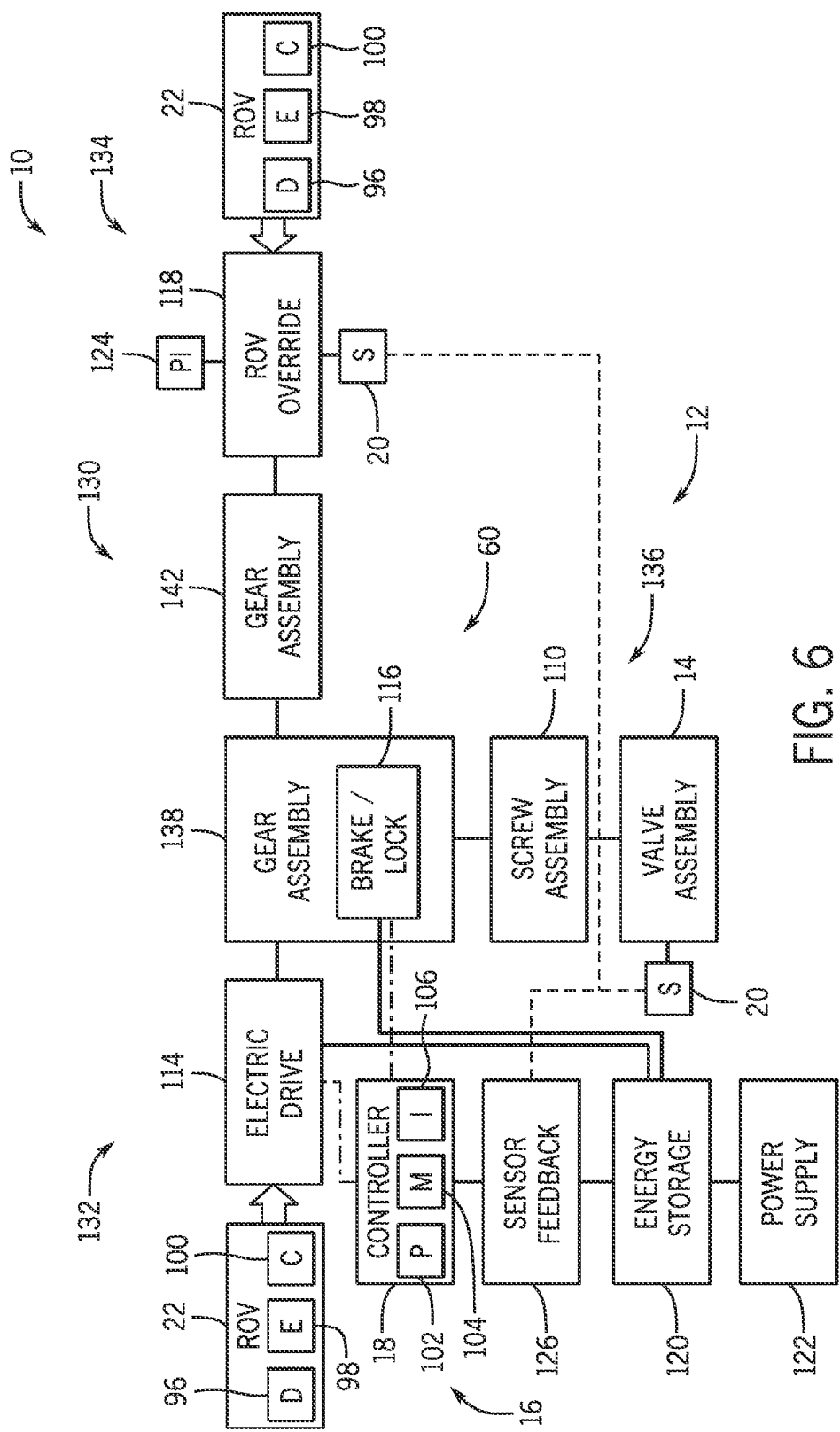
FIG. 6 is a block diagram of an embodiment of the fluid flow control system of FIG. 1, illustrating an electric actuator of the electric actuation system having a parallel configuration of first and second drives and a series configuration of a screw assembly and a gear assembly having a brake or lock.

FIGS. 5 and 6 are block diagrams of embodiments of the fluid flow control system 10 of FIG. 1, illustrating parallel and series configurations of the actuator components 62 of the electric actuator 60 of the electric actuation system 12. In each of FIGS. 5 and 6, the electric actuation system 12 has a parallel configuration 130 of first and second drives 132 and 134 and a series configuration 136 of the screw assembly 110 and a gear assembly 138 having a brake or lock 116. Referring first to FIG. 5, the series configuration 136 has the screw assembly 110 and at least a portion of the gear assembly 138 configured to rotate about an axis aligned with the valve stem 44 of the valve assembly 14. The gear assembly 138 also has one or more gears rotatable about an axis aligned with the electric drive 114 of the first drive 132 and a gear assembly 140 of the second drive 134. The gear assembly 140 is further coupled to a gear assembly 142, which in turn is coupled to the ROV override 118. In the illustrated embodiment, the ROV 22 is configured to interface with the ROV override 118 to transfer motion through the gear assembly 142, the gear assembly 140, the gear assembly 138, the screw assembly 110, and the valve assembly 14. The ROV 22 may use the one or more drives 96 to impart a rotational motion and/or axial motion through the ROV override 118 to cause movement of gears within the gear assembly 142. In certain embodiments, each of the gear assemblies 138, 140, and 142 may include a plurality of gears to increase a mechanical advantage by rotating smaller gears to drive larger gears, thereby providing more force to move the valve assembly 14.

In certain embodiments, the gear assembly 142 may include one, two, three, or more planetary gear assemblies, each including a central sun gear, an outer ring gear disposed coaxial and circumferentially about the sun gear, and a plurality of planet gears disposed between the sun gear and the outer ring gear. Each planetary gear assembly is configured to increase a mechanical advantage through movement of the sun gear and the planet gears relative to the ring gear. In certain embodiments, the gear assembly 142 includes two planetary gear assemblies disposed in a series arrangement. However, certain embodiments of the gear assembly 142 may include more planetary gear assemblies, or planetary gear assemblies disposed in a parallel arrangement. The gear assembly 140 may include a plurality of bevel gears configured to change a direction of the rotation between an axis along the gear assembly 142 and an axis along the gear assembly 138, such as a 90 degree turn between first and second bevel gears.

The gear assembly 138 also may include a plurality of gears configured to transition between an axis of the electric drive 114 and the gear assembly 140, and an axis of the screw assembly 110 and the valve assembly 14. For example, in certain embodiments, the gear assembly 138 may include a worm screw along the axis of the electric drive 114 and the gear assembly 140, and a worm gear mating with the worm screw and coaxial with the screw assembly 110 and the valve assembly 14. The gear assembly 138 may have a brake or lock 116 as an integral part or function of the gear assembly 138 (e.g., self-locking mechanism, self-locking gear assembly, or self-locking brake) due to the intermeshing worm screw and worm gear, and/or the gear assembly 138 may include an additional brake or lock 116 (e.g., an electrical or electro-magnetic brake or lock, a mechanical brake or lock, a fluid brake or lock, or a combination thereof). Accordingly, the gear assembly 138 with the brake or lock 116 may be configured to lock a position of the screw assembly 110 and the valve assembly 114 when not being driven by the electric drive 114 or the ROV 22 interfacing with the ROV override 118.

Additionally, the electric drive 114 may be retrievable by an ROV 22 as illustrated in FIG. 5. The electric drive 114 may be removed and replaced with a different electric drive 114, a different type of drive such as a fluid drive, or the ROV 22 also may be used to override operation along the same axis as the electric drive 114.

The other aspects illustrated in FIG. 5 are the same as discussed in detail above with reference to FIGS. 1-4. For example, the elements having like element numbers have all of the features described above. The control system 16 is configured to receive the sensor feedback 126 from the sensors 20 and the energy storage units 120 to facilitate operation of the electric drive 114, the brake or lock 116, and the position of the valve assembly 14. In the illustrated embodiment, the first drive 132 includes at least the electric drive 114, and optionally the ROV 22 configured to provide a driving force along the same axis as the electric drive 114. The second drive 134 includes the gear assembly 140, the gear assembly 142, the ROV override 118, and the ROV 22 configured to provide a driving force to provide motion through the ROV override 118, the gear assemblies 138, 140, and 142, the screw assembly 110, and the valve assembly 14.

FIG. 6 is a block diagram of an embodiment of the fluid flow control system 10 as illustrated in FIG. 1, further illustrating an embodiment of the electric actuation system 12 similar to that shown in FIG. 5. In the embodiment of FIG. 6, the fluid flow control system 10 is substantially the same as illustrated in FIG. 5, except for the removal of the gear assembly 140 and the alignment of the gear assembly 142, the ROV override 118, and the ROV 22 along a common axis with the electric drive 114 and a portion of the gear assembly 138. In particular, the illustrated parallel configuration 130 of the first and second drives 132 and 134 is coaxial along the ROV 22, the electric drive 114, at least one gear of the gear assembly 138, the gear assembly 142, the ROV override 118, and the corresponding ROV 22. Other aspects of the electric actuation system 12 of FIG. 6 are the same as discussed above with reference to FIG. 5. Accordingly, the gear assembly 142 may include one or more planetary gear assemblies disposed between the ROV override 118 and the gear assembly 138. The gear assembly 138 may include a worm screw disposed coaxial with the electric drive 114 and the gear assembly 142, and a worm gear that interfaces with the worm screw and rotates coaxial with the screw assembly 110 to drive movement of the valve assembly 14. In the embodiment of FIG. 6, the electric drive 114 may be retrievable and replaceable via the ROV 22, although the ROV 22 also may provide an override function along the same axis as the electric drive 114. The ROV 22 coupled to the ROV override 118 also provides an override function via movement through the gear assembly 142, the gear assembly 138, and the screw assembly 110 to move the valve assembly 14.

Figure 7:
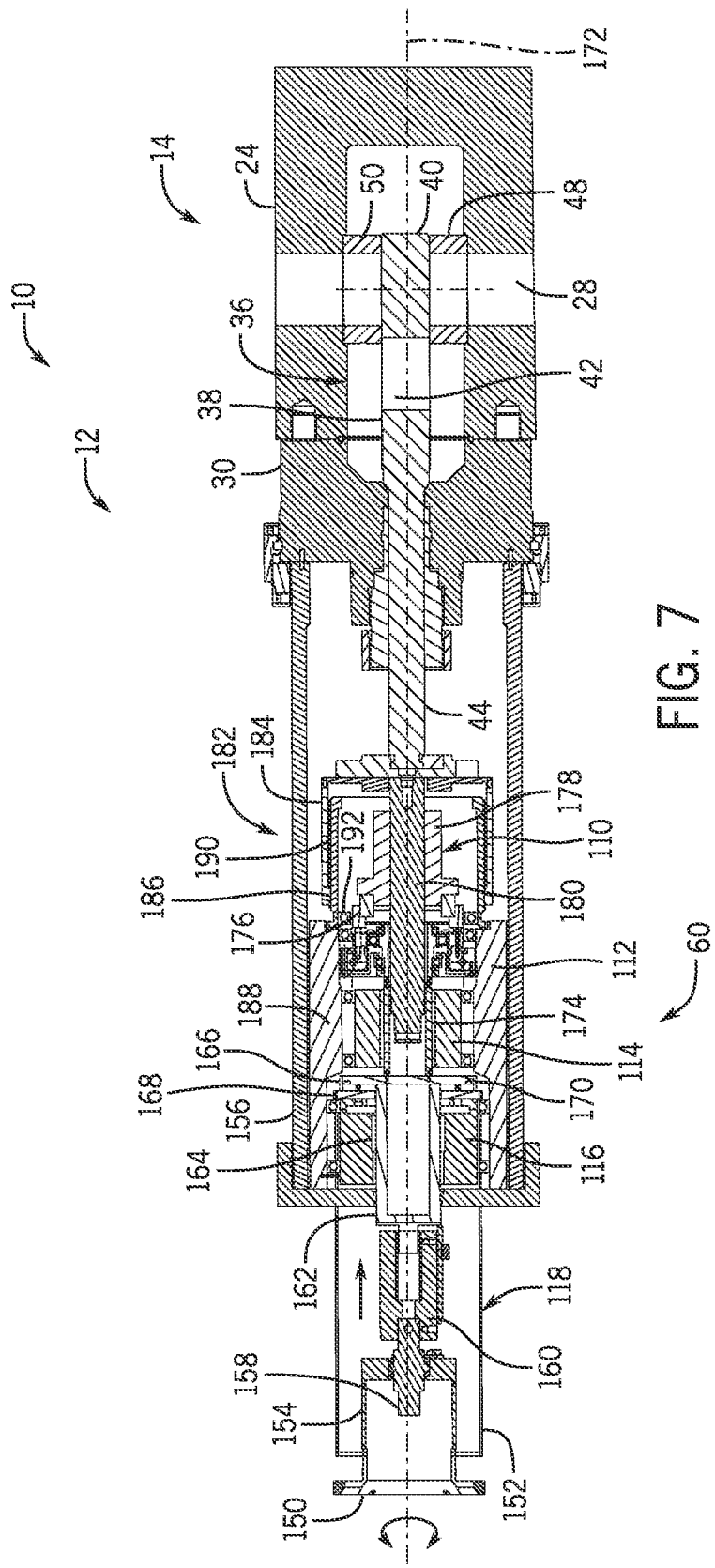
FIG. 7 is a cross-sectional side view of an embodiment of the fluid flow control system of FIGS. 1 and 2, further illustrating details of the electric actuation system as shown in FIG. 2.

FIG. 7 is a cross-sectional side view of an embodiment of the fluid flow control system of FIGS. 1 and 2, further illustrating details of the electric actuation system 12 as shown in FIG. 2. In the illustrated embodiment, the electric actuation system 12 has a series arrangement of the screw assembly 110, the gear assembly 112, the electric drive 114, the brake or lock 116, and the ROV override 118. The electric actuation system 12 is configured to move the gate 38 of the valve assembly 14 between the open and closed positions via movement of the valve stem 44. In the illustrated embodiment, the ROV override includes a ROV mount interface 150 coupled to a support 152, wherein the ROV mount interface 150 includes an ROV receptacle 154 extending axially into the support 152. The ROV mount interface 150 may include an annular wall or cup-shaped structure, which extends axially into an annular shaped structure of the support 152. Accordingly, the ROV receptacle 154 also may have an annular or cup-shaped structure. The support 152 is coupled to an actuator housing 156 of the electric actuator 60. The ROV receptacle 154 also includes an ROV drive interface 158, which may include a tool interface to transmit torque into the electric actuator 60 via one or more shafts, such as shafts 160 and 162. The ROV drive interface 158 may have a hex head, a square head, a flat head, or another suitable tool interface configured to transmit torque (i.e., a torque transfer interface). The ROV drive interface 158 also may be configured to transmit an axial motion from the ROV 22 through the shafts 160 and 162 into the electric actuator 60.

As further illustrated, the shafts 160 and 162 are coupled to the brake or lock 116. In particular, the shaft 162 extends through an internal bore 164 in the brake or lock 116 to a plate 166. The plate 166 is configured to move in response to movement of the ROV drive interface 158. The plate 166 is configured to engage and disengage with the corresponding plate 168 of the brake or lock 116. The plates 166 and 168 have intermeshing teeth at a serrated or teeth interface 170. Accordingly, if the ROV 22 imparts an axial motion through the ROV drive interface 158, the shafts 162 and 164 are configured to push the plate 166 in an axial direction along a central axis 172 away from the plate 168, thereby separating the serrated or teeth interface 170 to disengage or unlock the brake or lock 116. Otherwise, the serrated or teeth interface 170 blocks rotational motion or torque transfer between the plates 166 and 168, thereby blocking rotational movement of the electric actuator 60. Upon unlocking the brake or lock 116, the ROV drive interface 158 may receive a torque transfer from the ROV 22. The torque transfer applied at the ROV drive interface 158 causes rotation of the plate 166, which in turn couples to and causes rotation of a rotor 174 of the electric drive 114, the gear assembly 112, and an annular connector 176 coupled to a female threaded portion 178 of the screw assembly 110. The female threaded portion 178 is disposed about and threads onto a male threaded portion 180 of the screw assembly 110. In certain embodiments, the screw assembly 110 may be a roller screw assembly having a plurality of rollers between the female and male threaded portions 178 and 180, or the screw assembly 110 may be a ball screw assembly having a plurality of balls between the female and male threaded portions 178 and 180, or the screw assembly 110 may have one or more other types of low friction elements (e.g., bearings) between the female and male threaded portions 178 and 180. The rollers, balls, or other low friction elements (e.g., bearings) are configured to reduce friction during rotation while also withstanding thrust and torsional loads. The screw assembly 110 is configured to convert rotational motion to linear motion, or vice versa.

The male threaded portion 180 is coupled to an axial guide assembly 182, which is configured to block rotation of the male threaded portion 180 while enabling axial movement of the male threaded portion 180 to move the valve stem 44 and the gate 38 of the valve assembly 14. As illustrated, the axial guide assembly 182 includes an axial guide 184 coupled to the male threaded portion 180, and an axial guide 186 coupled to a support 180 disposed in a fixed position within the housing 156 of the electric actuator 60. The axial guides 184 and 186 may be concentric annular structures, such as a first annular axial guide 184 disposed circumferentially about a second annular axial guide 186. The axial guides 184 and 186 may be movably coupled together along an axial guide or spline interface 190, which may include a plurality of axial splines oriented parallel with the central axis 172. The axial guide or spline interface 190 is configured to block rotational movement between the axial guides 184 and 186, while enabling the axial guide 184 to move in an axial direction along the central axis 172 relative to the axial guide 186. Accordingly, as the female threaded portion 178 rotates along the male threaded portion 180, the male threaded portion 180 moves in an axial direction along the central axis 172, guided by the axial guide assembly 182, and driving the valve stem 44. The valve stem 44 is coupled to the male threaded portion 180 and/or the axial guide 184. The electric actuator 60 also may include one or more bearings 192 disposed between the annular connector 176 and the support 188.

Accordingly, the ROV 22 is configured to extend into the ROV receptacle 154, push the ROV drive interface 158 to cause the plate 166 to disengage and unlock from the plate 168 to unlock the brake or lock 116, and then rotate the ROV drive interface 158 to transfer a torque through the shafts 160 and 162, the rotor 174, the gear assembly 112, the annular connector 176, and the female threaded portion 178. This rotation induced by the ROV 22 in turn causes an axial movement of the male threaded portion 180 coupled to the valve stem 44 to drive axial movement of the gate 38 between the open and closed positions relative to the fluid passage 28.

Additionally, during normal operation, the electric drive 114 is configured to transfer torque through the gear assembly 112 to the annular connector 176 and the female threaded portion 178, thereby driving the axial movement of the male threaded portion 180 coupled to the valve stem 44 to move the gate 38 between the open and closed positions relative to the fluid passage 28. Similar to operation of the ROV override 118, when the electric drive 114 is used to move the gate 38, the brake or lock 116 may be disengaged or unlocked by moving the plate 166 away from the plate 168. For example, in certain embodiments, the brake or lock 116 may be an electric or electro-magnetic brake or lock, such that the application of electricity to the brake or lock 116 causes a disengagement between the plates 166 and 168. The fluid flow control system 10 may be configured to simultaneously provide electricity to the brake or lock 116 and the electric drive 114, or the brake or lock 116 may be powered at a time before operation of the electric drive 114. In either case, the brake or lock 116 may be normally in a locked position (e.g., self-locking) by configuring the plates 166 and 168 against one another at the serrated or teeth interface 170.

The brake or lock 116 also may be operated via a fluid drive, such as a hydraulic drive or pneumatic drive to move the plates 166 and 168 away from one another and/or toward one another. In certain embodiments, the brake or lock 116 has a normally locked position (e.g., self-locking), such that the brake or lock 116 will automatically move to a locked position when a driving force or energy is not applied. However, the brake or lock 116 also may be configured with a normally open or unlocked configuration, such that the brake or lock 116 allows movement unless otherwise actuated.

Figure 8:
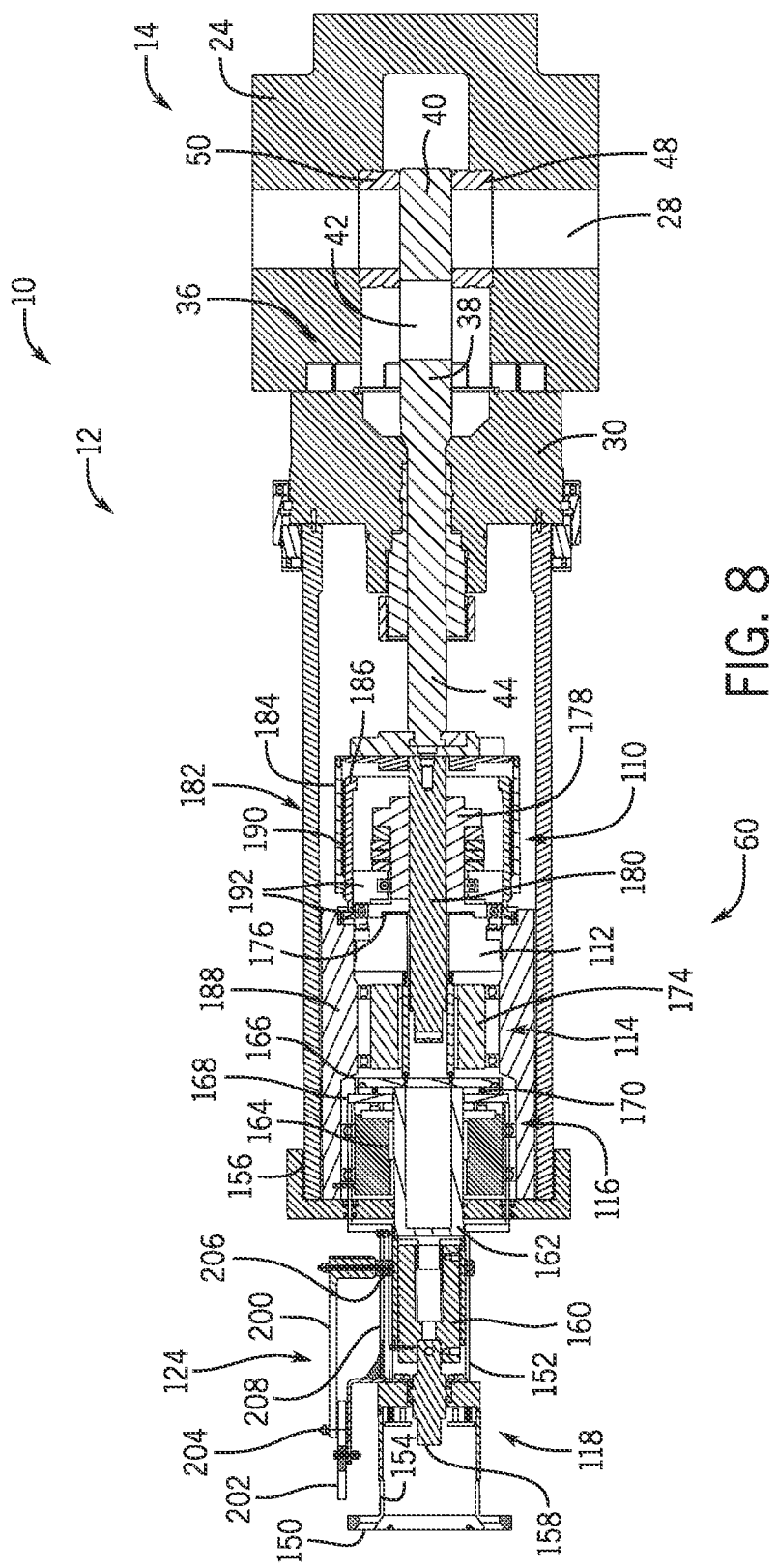
FIG. 8 is a cross-sectional side view of an embodiment of the fluid flow control system of FIGS. 1 and 2, further illustrating details of the electric actuation system as shown in FIG. 2 with a position indicator coupled to an override, wherein the electric actuation system positions a valve in a closed position.

FIG. 8 is a cross-sectional side view of an embodiment of the fluid flow control system as illustrated in FIGS. 1 and 2, illustrating a configuration of the electric actuation system 12 substantially the same as illustrated in FIG. 7 with several modifications. Otherwise, the components with like element numbers are the same as described in detail above. As illustrated, the ROV override 118 of FIG. 8 further includes a position indicator 124. The position indicator 124 includes arms 200 and 202 coupled together at a joint 204. The arm 200 is coupled to the shaft 160, such that the arm 200 moves in response to axial movement of the shaft 160. As the arm 200 moves during actuation of the shaft 160 via the ROV 22, the arm 202 rotates about the joint 204 to provide a visual indication of a position of the ROV override, the electric actuator 60, and the gate 38 of the valve assembly 14. For example, the arm 200 may be coupled to an exterior of the shaft 160 along a threaded interface 206 while the arm 200 moves along an axial slot 208 in the support 152. As the ROV 22 rotates the ROV drive interface 158 and thus the shaft 160, the threaded interface 206 caused the arm 200 to move in an axial direction along the axial slot 208, thereby causing rotational movement of the arm 202 about the joint 204. In the illustrated embodiment, the support 152 of the ROV drive interface 158 is configured differently than shown in FIG. 7. In contrast to FIG. 7, the support 152 of FIG. 8 extends axially between the ROV mount interface 150 and the actuator housing 156. In certain embodiments, the fluid flow control system of FIG. 7 may incorporate the position indicator 124 of FIG. 8 and other features discussed below.

The electric actuation system 12 also has other differences relative to FIG. 7, such as the configuration of the female threaded portion 178 disposed about the male threaded portion 180 of the screw assembly 110. As illustrated in FIG. 8, the female threaded portion 178 has one of the bearings 192 disposed between the axial guide 186 and the female threaded portion 178, and the annular connector 176 is disposed at an axial end of the female threaded portion 178 adjacent the gear assembly 112. Otherwise, the components illustrated in FIG. 8 are substantially the same as discussed above and with reference to FIG. 7. Accordingly, each of the components and their functionality is the same as discussed above. In the embodiment of FIG. 8, the ROV 22 is not engaged with ROV interface 118, and the electric drive 114 is operated to position the gate 38 in a closed position having the solid gate portion 40 aligned with the fluid passage 28.

Figure 9:
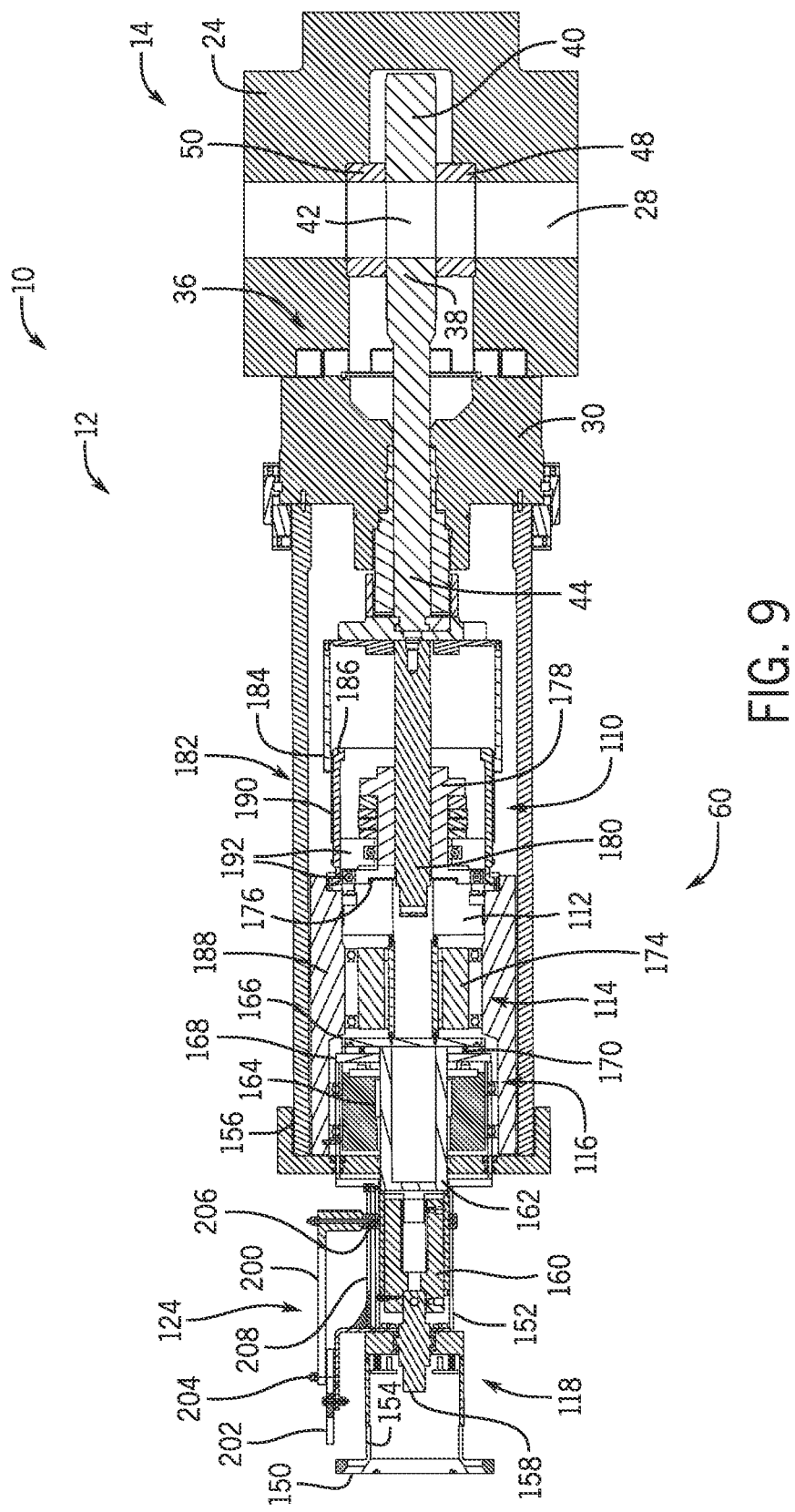
FIG. 9 is a cross-sectional side view of the fluid flow control system of FIG. 8, further illustrating the electric actuation system positioning the valve in an open position.

FIG. 9 is a cross-sectional side view of the fluid flow control system 10 of FIG. 8, further illustrating the electric actuation system 12 in an open position of the valve assembly 14. Otherwise, the electric actuation system 12 is the same as discussed above with reference to FIGS. 7 and 8. In comparison to FIG. 8, the electric actuator 60 of FIG. 9 has been actuated to cause movement of the valve stem 44 in an axial direction to cause the gate 38 to move to an open position having the valve opening 42 aligned with the fluid passage 28 in the valve assembly 14. To move from the close position to the open position of the gate 38, the electric drive 114 of the electric actuator 60 transfers a rotational motion through the gear assembly 112 into the female threaded portion 178, which rotates about the male threaded portion 180 to cause axial movement of the male threaded portion 180 and the valve stem 44. Again, the male threaded portion 180 is guided to move only in the axial direction via the axial guide assembly 182, which has the axial guide or spline interface 190 between the axial guides 184 and 186. As illustrated in FIG. 9, the axial guide 184 is axially extended relative to the axial guide 186 (i.e., axially extended position), while still engaged via the axial guide or spline interface 190. In this axially extended position of the axial guide 184, the male threaded portion 180 is also axially extended toward the valve assembly 14, thereby driving the valve stem 44 to move the gate 38 from the close position of FIG. 8 to the open position of FIG. 9. As illustrated in FIG. 9, the position indicator 124 has not changed in position, because the position indicator 124 is configured to show movement caused by the ROV 22 at the ROV interface 118. In some embodiments, a similar position indicator 124 also may be included to show movement of the electric actuator 60 caused by the electric drive 114.

Figure 10:
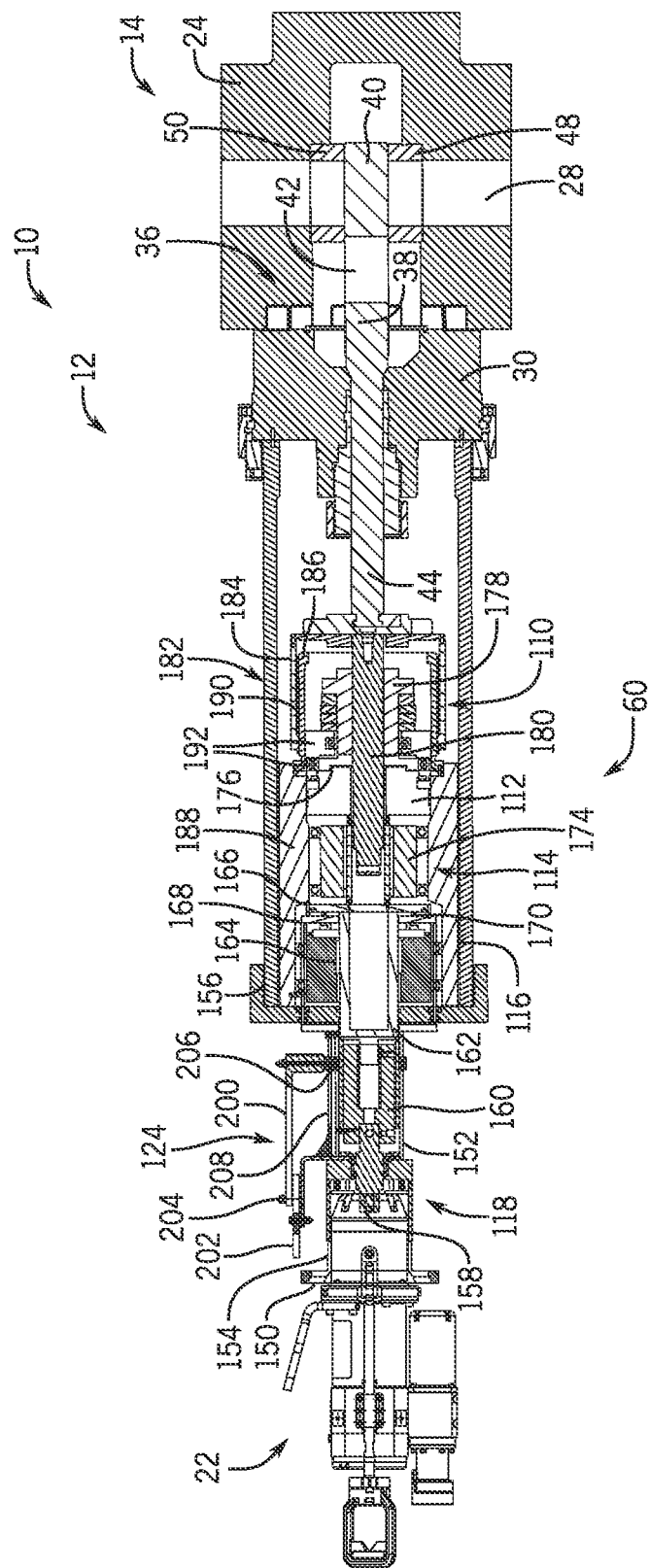
FIG. 10 is a cross-sectional side view of the fluid flow control system of FIG. 8, further illustrating the electric actuation system being overridden by a remotely operated vehicle (ROV) at the override.

FIG. 10 is a cross-sectional side view of the fluid flow control system 10 of FIGS. 8 and 9, further illustrating the ROV 22 coupled to the ROV mount interface 150 to operate the ROV override 118. As illustrated, the ROV 22 extends into the ROV receptacle 154 and engages with the ROV drive interface 158. In operation, the ROV 22 is configured to push the ROV drive interface 158 to disengage and unlock the brake or lock 116 by pushing the plate 166 away from the plate 168. Additionally, the ROV 22 is configured to rotate or apply torque to the ROV drive interface 158, thereby transferring torque through the shafts 160 and 162, the rotor 174, the gear assembly 112, and the female threaded portion 178 of the screw assembly 110. This torque applied by the ROV 22 causes axial motion of the male threaded portion 180 and the valve stem 44, thereby driving the gate 38 between the open and closed positions. The components of the electric actuation system 12 of FIG. 10 are the same as illustrated in FIGS. 8 and 9, and thus the features and functions of these components are the same as described in detail above with reference to FIGS. 7-9. In certain embodiments, the ROV 22 may include one or more drives 96, energy storage units 98, and controllers 100 as discussed in detail above with reference to FIG. 1. For example, the ROV 22 may include an electric drive, a hydraulic drive, and/or a pneumatic drive configured to transfer an axial motion and/or a rotational motion to operate the electric actuator 60 as discussed above.

Figure 11:
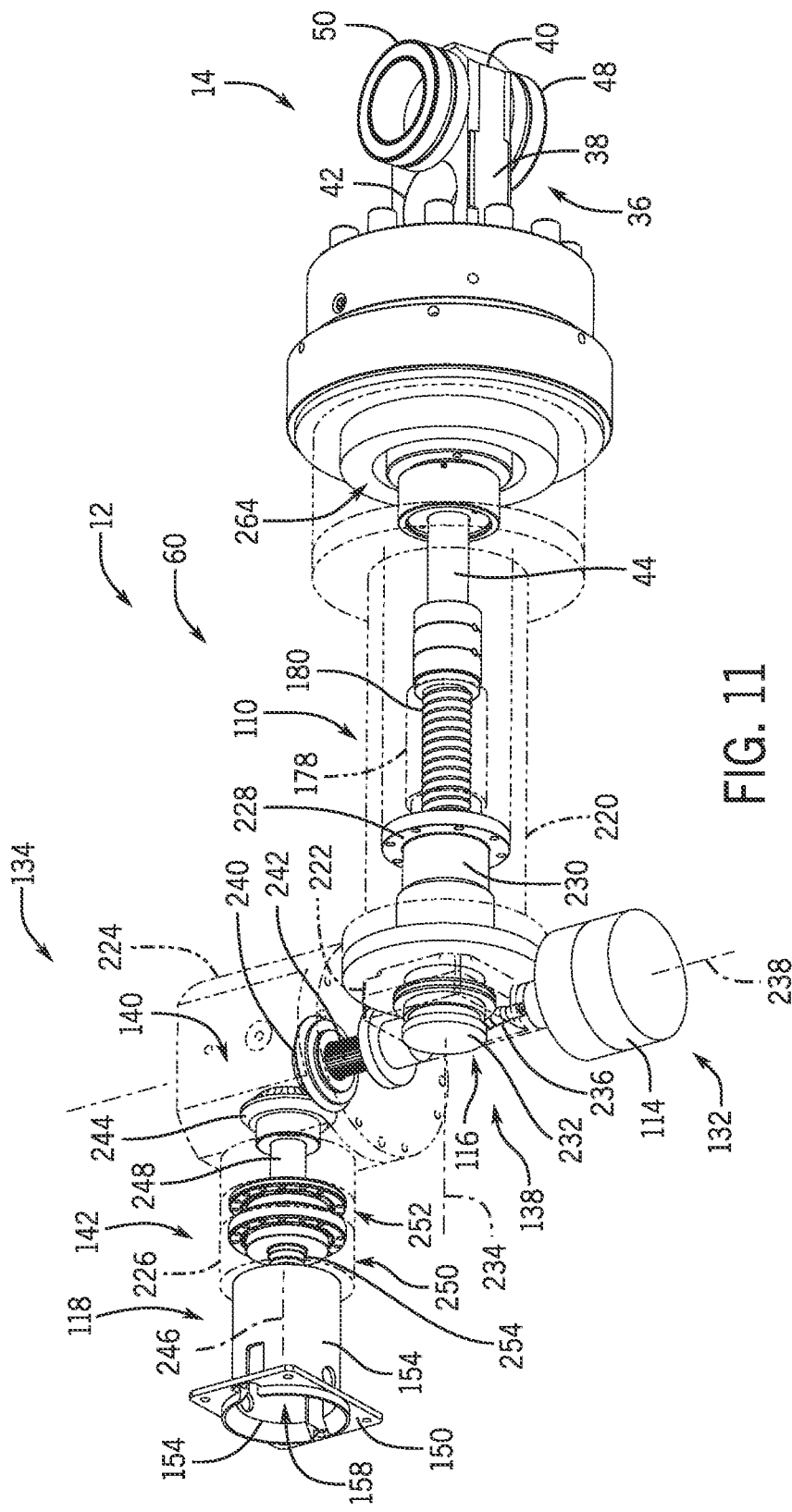
FIG. 11 is a perspective view of an embodiment of the fluid flow control system of FIG. 1, further illustrating an embodiment of the electric actuation system as illustrated in FIG. 5, wherein the electric actuation system positions a valve in a closed position.
Figure 12:
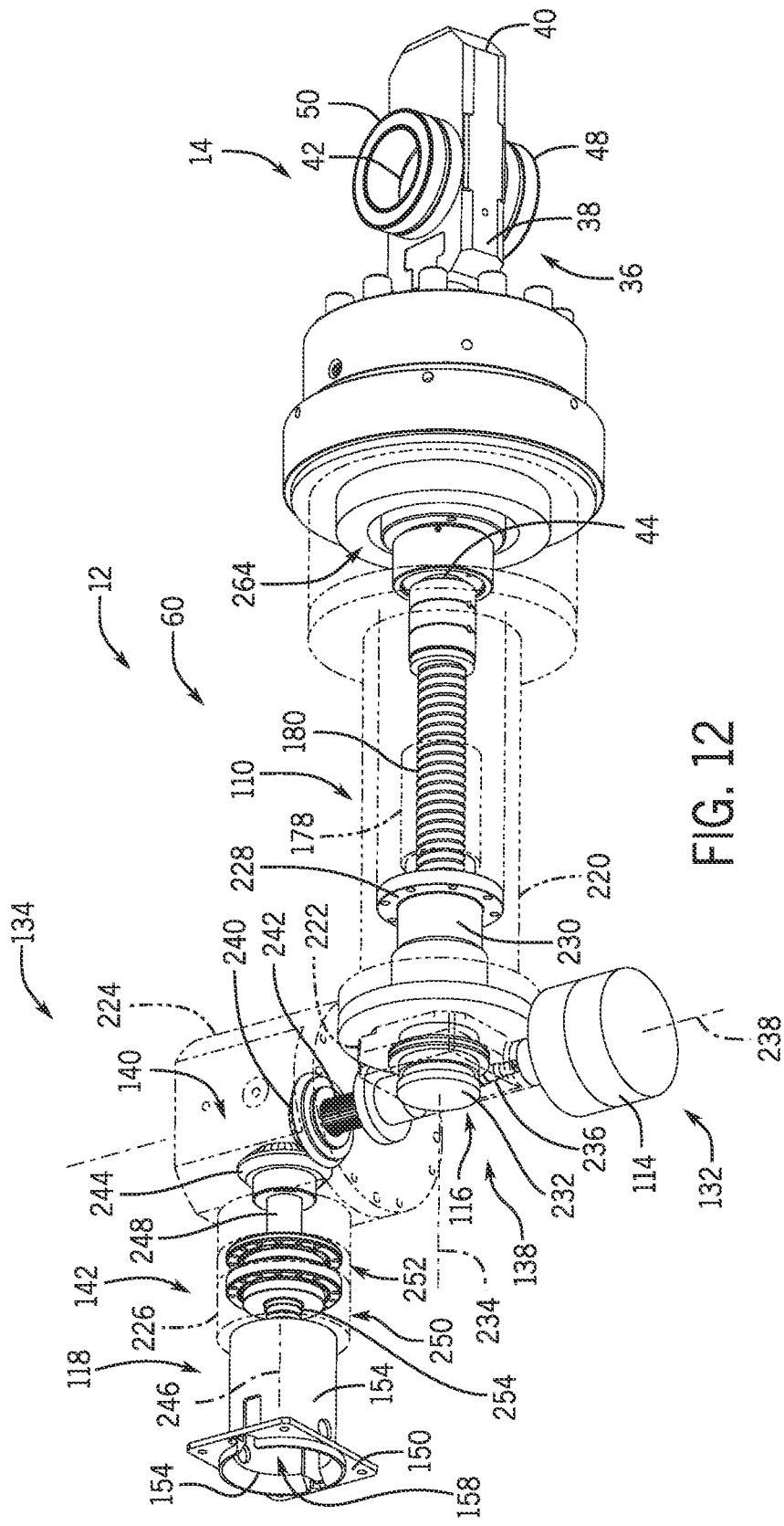
FIG. 12 is a perspective view of the fluid flow control system of FIG. 11, further illustrating the electric actuation system positioning the valve in an open position.

FIGS. 11 and 12 are perspective views of an embodiment of the fluid flow control system 10 of FIG. 1, further illustrating an embodiment of the electric actuation system 12 as illustrated in FIG. 5. FIG. 11 is a perspective view of the electric actuator 60 in a retracted position having the gate 38 in a closed position, while FIG. 12 is a perspective view of the electric actuator 60 in an extended position having the gate 38 in an open position. FIGS. 11 and 12 show portions of the electric actuation system 12 in dashed lines to illustrate the interior components, such as the screw assembly 110 within an actuator housing 220 and gear assemblies 138, 140, and 142 disposed in respective housings 222, 224, and 226.

As illustrated in FIGS. 11 and 12, the screw assembly 110 includes the female threaded portion 178 disposed about and threaded along the male threaded portion 180. In certain embodiments, the screw assembly 110 may be a roller screw assembly having a plurality of rollers between the female and male threaded portions 178 and 180, or the screw assembly 110 may be a ball screw assembly having a plurality of balls between the female and male threaded portions 178 and 180. The male threaded portion 180 is coupled to the valve stem 44, which in turn is coupled to the gate 38. The female threaded portion 78 is coupled to a flange 228 of a shaft 230. The shaft 230 is coupled to the gear assembly 138.

For example, the shaft 230 is coupled to a worm gear 232 along a central axis 234 of the screw assembly 110, while the worm gear 232 engages with a worm screw 236. The worm gear 232 engages with the worm screw 236 along a spiral or threaded interface, which may represent a self-retaining lock feature of the brake or lock 116. For example, during operation, the gear ratio and engagement between the worm gear 232 and the worm screw 236 may integrally function (i.e., self-locking function) to brake or lock the rotation of the worm gear 232, the shaft 230, and so forth. The worm screw 236 of the gear assembly 138 is further coupled to the electric drive 114 and the gear assembly 140 along a central axis 238, which is generally crosswise or perpendicular to the central axis 234. The gear assembly 138 is disposed axially between the electric drive 114 and the gear assembly 140.

The gear assembly 140 includes a plurality of bevel gears, such as a first bevel gear 240 coupled to the worm screw 236 via a shaft 242 along the central axis 238, and a second bevel gear 244 coupled to the first bevel gear 240 and disposed along a central axis 246 of the ROV override 118. Accordingly, the bevel gears 240 and 244 are disposed coaxial with the axes 238 and 246, which may be crosswise or perpendicular to one another to change the direction of rotation from the central axis 246 to the central axis 238. The bevel gear 244 of the gear assembly 140 is further coupled to the gear assembly 142 via a shaft 248.

The gear assembly 142 may include one or more planetary gear assemblies, such as planetary gear assemblies 250 and 252. Each planetary gear assembly 250 and 252 includes a sun gear, a ring gear disposed coaxial with and circumferentially about the sun gear, and a plurality of planetary gears disposed radially between the sun gear and the ring gear. Accordingly, the planetary gear assemblies 250 and 252 are arranged in series with one another to provide a mechanical advantage when transferring torque from the ROV 22 at the ROV override 118 to the gear assembly 140, the gear assembly 138, and the screw assembly 110 to actuate the gate 38. The planetary gear assemblies 250 and 252 are coupled together and coupled to the ROV drive interface 158 via a shaft 254.

Accordingly, during operation, the ROV 22 may engage with the ROV override 118, provide torque at the ROV drive interface 158 to drive rotation of the planetary gear assemblies 250 and 252 of the gear assembly 142, while the bevel gears 240 and 244 transfer the rotational motion from the central axis 246 to the central axis 238 into the gear assembly 138. In turn, the rotation of the bevel gear 240 rotates the worm screw 236, which in turn rotates the worm gear 232 to cause rotation of the shaft 230, the flange 228, and the female threaded portion 178 of the screw assembly 110. The shaft 230 transfers torque and rotational motion to the female threaded portion 178, while the male threaded portion 180 is only able to move axially along the central axis 234. Accordingly, as the female threaded portion 178 rotates along the male threaded portion 180, the male threaded portion 180 moves axially along the central axis 234 to drive the valve stem 44 to move the gate 38 between the open and close positions.

Additionally, when the ROV 22 is not being used to override operation of the electric actuator 60, the electric drive 114 may operate the electric actuator 60 in a similar manner by driving rotation of the worm screw 236. In particular, the electric drive 114 rotates the worm screw 236, which in turn drives rotation of the worm gear 232, the shaft 230, the flange 228, and the female threaded portion 178 about the central axis 234. In response to this rotation, the male threaded portion 180 moves axially along the interior of the actuator housing 220, as an axial guide assembly 264 (see FIGS. 13 and 14) blocks rotation of the male threaded portion 180.

Again, the gear ratio and configuration of the worm gear 232 and the worm screw 236 may integrally function as the brake or lock 116 (e.g., self-locking mechanism or assembly) when a rotational force is not applied to the worm screw 236. However, in certain embodiments, a separate or additional brake or lock 116 may be coupled to the shaft 230 to control rotational movement of the female threaded portion 178. Accordingly, the brake or lock 116 may include an electric or electro-magnetic brake or lock, a fluid driven brake or lock, a mechanical brake or lock, or any combination thereof. As noted above, FIG. 11 illustrates the electric actuator 60 moved by the electric drive 114 to a retracted position of the male threaded portion 180 (i.e., retracted away from the valve assembly 14), thereby positioning the gate 38 in a close position. In contrast, FIG. 12 illustrates the electric actuator 60 moved by the electric drive 114 to an extended position of the male threaded portion 180 (i.e., extended toward the valve assembly 14), thereby positioning the gate 38 in an open position.

Figure 13:
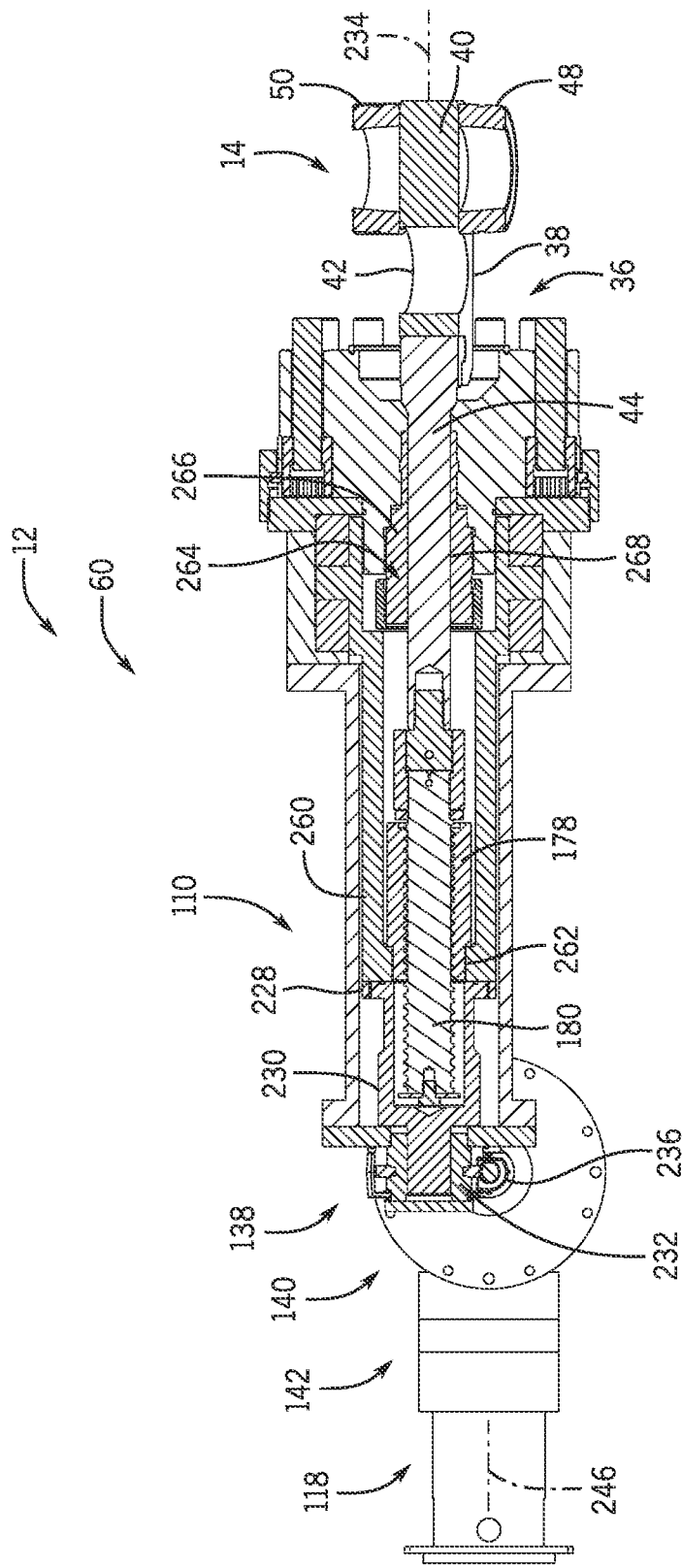
FIG. 13 is a cross-sectional side view of the fluid flow control system with the valve in the closed position as illustrated in FIG. 11, further illustrating an embodiment of a screw assembly coupled to a valve stem of the valve.
Figure 14:
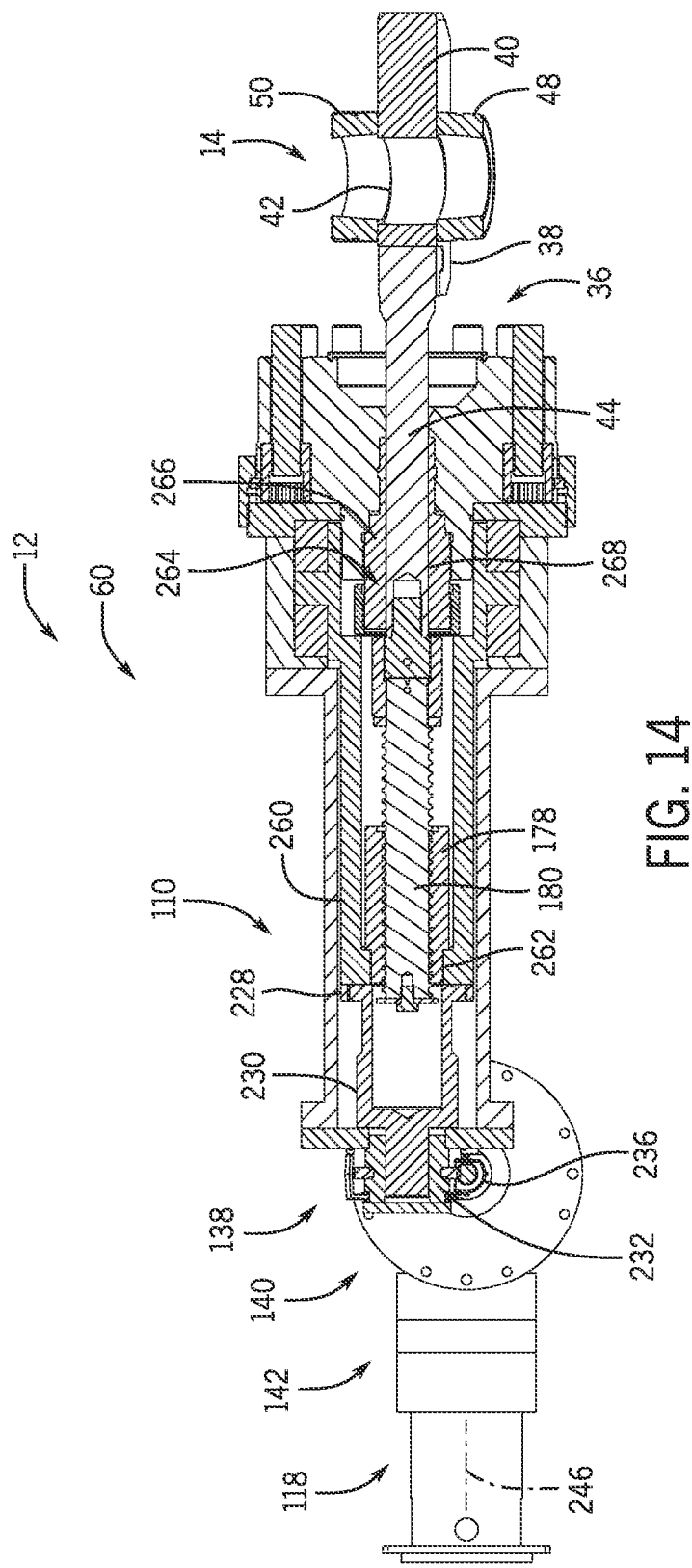
FIG. 14 is a cross-sectional side view of the fluid flow control system with the valve in the open position as illustrated in FIG. 12, further illustrating movement of the screw assembly, the valve stem, and the valve relative to FIG. 13.

FIGS. 13 and 14 are cross-sectional side views of the fluid flow control system 10 of FIGS. 11 and 12, respectively, further illustrating details of the electric actuator 60 in retracted and extended positions to move the gate 38 between closed and open positions. Otherwise, the components illustrated and described in detail above with reference to FIGS. 11 and 12 are the same. As illustrated in FIGS. 13 and 14, the worm screw 236 engages with the worm gear 232, which in turn couples to the shaft 230 to drive rotation of the female threaded portion 178 in response to torque applied by either the electric drive 114 or the ROV 22 when coupled to the ROV override 118. As the shaft 230 is driven by the worm gear 232, the torque is transferred through the flange 228 to an annular sleeve 260 coupled to the female threaded portion 178 at a torque transfer connection 262. The torque transfer connection 262 may include a plurality of axial protrusions disposed in axial slots, splines, or other torque transfer connections. The rotation of the female threaded portion 178 causes axial movement of the male threaded portion 180, which is blocked from rotation via the axial guide assembly 264.

The axial guide assembly 264 may include an annular sleeve 266 disposed about the valve stem 44, wherein an axial guide or spline interface 268 extends between the annular sleeve 266 and the valve stem 44. In some embodiments, rather than an axial guide or spline interface 268, the valve stem 44 may interface with the annular sleeve 266 with a non-circular shaped interface, such as a square cross-section, a rectangular cross-section, a triangular cross-section, or some other axial guide feature. As a result, the axial guide assembly 264 enables only axial movement of the valve stem 44 and the male threaded portion 180 along the central axis 234, while the female threaded portion 178 rotates about the male threaded portion 180. Additionally, the female threaded portion 178 is disposed in a fixed axial position coupled to the annular sleeve 260 and/or the flange 228.

In certain embodiments, the screw assembly 110 may include a roller screw assembly having a plurality of rollers between the female and male threaded portions 178 and 180, a ball screw assembly having a plurality of balls between the female and male threaded portions 178 and 180, or another suitable screw assembly with low friction elements configured to transfer rotational motion into linear motion along the central axis 234. Again, FIG. 13 illustrates the screw assembly 110 actuated by the electric drive 114 to retract the male threaded portion 180 away from the valve assembly 14 to move the gate 38 into a close position, while FIG. 14 illustrates the screw assembly 110 actuated by the electric drive 114 to extend the male threaded portion 180 toward the valve assembly 14 to move the gate 38 to an open position.

Figure 15:
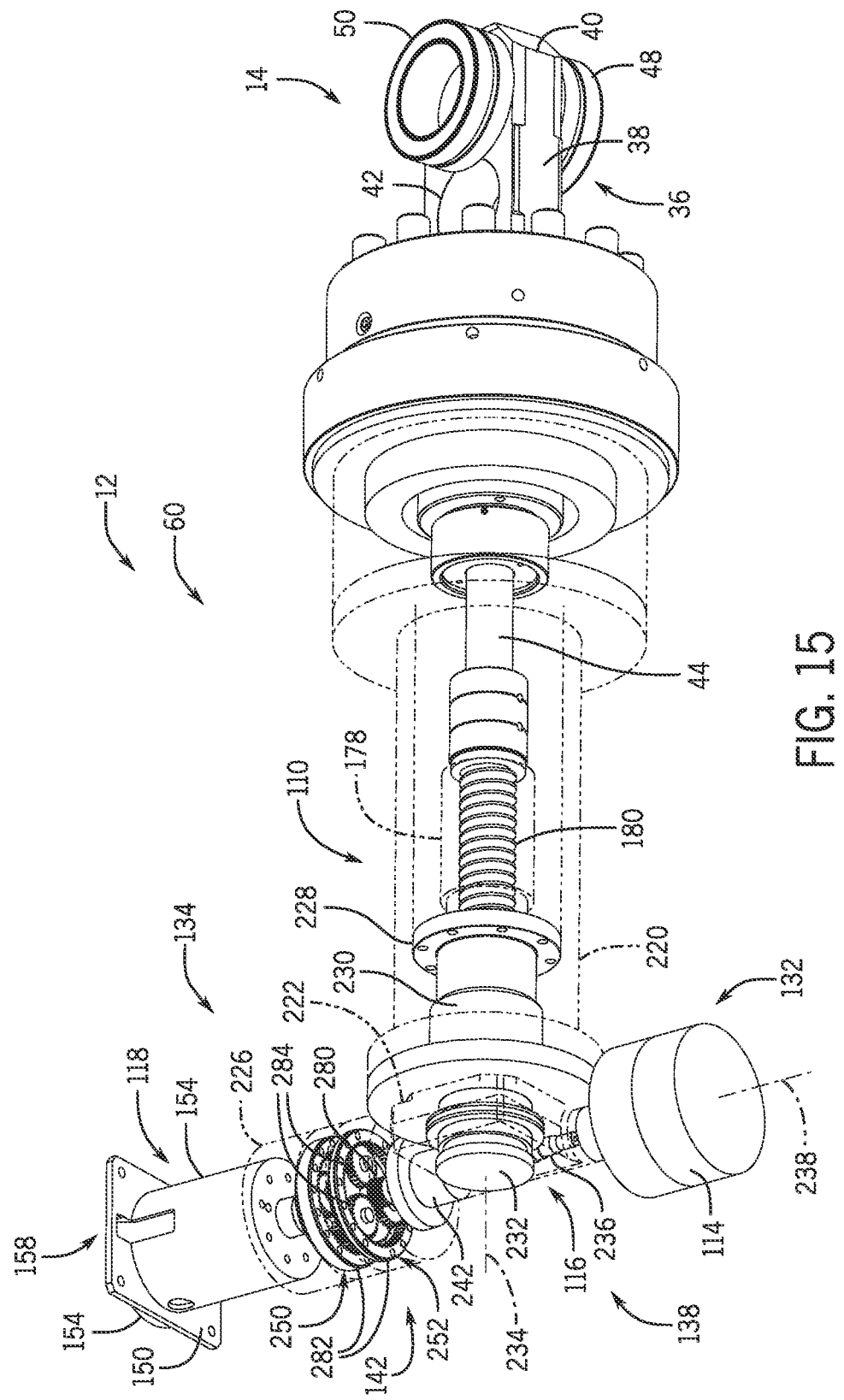
FIG. 15 is a perspective view of an embodiment of the fluid flow control system of FIG. 1, further illustrating an embodiment of the electric actuation system as illustrated in FIG. 6, wherein the electric actuation system positions a valve in a closed position.

FIG. 15 is a perspective view of an embodiment of the fluid flow control system 10 of FIG. 1, further illustrating details of the electric actuation system 12 as illustrated and described above with reference to FIG. 6. The electric actuation system 12 of FIG. 15 is substantially the same as the electric actuation system 12 of FIGS. 11-14. However, the electric actuation system 12 of FIG. 15 eliminates the gear assembly 140 having the bevel gears 240 and 244 and aligns the gear assembly 142 and the ROV override 118 along the same central axis 238 as the electric drive 114 and the worm screw 236 of the gear assembly 138. In particular, the planetary gear assemblies 250 and 252 of the gear assembly 142 couples with the shaft 242, which in turn couples with the worm screw 236. The worm screw 236 is disposed axially between the electric drive 114 and the gear assembly 142. Otherwise, the electric actuation system 12 of FIG. 15 operates the same as discussed in detail above with reference to FIGS. 5,6, and 11-14.

As further illustrated in FIG. 15, each of the planetary gear assemblies has a sun gear 280, a ring gear 282 disposed coaxially with and surrounding the sun gear 280, and a plurality of planet gears 284 disposed between the sun gear 280 and the ring gear 282. In operation, the worm screw 236 is driven to rotate by either the electric drive 114 or by the ROV 22 applying torque at the ROV override 118. This rotation of the worm screw 236 drives rotation of the worm gear 232, the shaft 230, the flange 228, and the female threaded portion 178. In turn, the rotation of the female threaded portion 178 drives axial movement of the male threaded portion 180 and the valve stem 144, thereby driving axial movement of the gate 38 between the open and close positions. Again, the male threaded portion 180 and the valve stem 44 may be blocked from rotating by the axial guide assembly 264, such as described in detail above. Other aspects of the electric actuation system 12 of FIG. 15 are substantially the same as described in detail above.

Technical effects of the disclosed embodiments include an electric actuation system 12 that may eliminate drawbacks of a spring biased actuation system, such as by reducing an amount of force to move a valve assembly 14 between open and closed positions. The electric actuation system 12 includes an electric actuator 60 having an electric drive 114 powered by an energy storage unit 120, such as one or more batteries. The energy storage unit 120 ensures that power is available to operate the electric drive 114 during normal operation and emergency situations. The electric actuation system 12 also includes a ROV override 118 to enable an ROV 22 to override operation of the electric actuator 60, for example, if the electric drive 114 is not functioning properly. The election actuation system 12 further includes one or more brakes or locks 116, which may be separate units or integrally formed with the electric drive 114 and/or gear assemblies. The brakes or locks 116 may be configured to self-lock when not applying force to operate the electric actuation system 12, thereby securing or locking a current position of the electric actuator 60 and the valve assembly 14.

The subject matter described in detail above may be defined by one or more clauses, as set forth below.

An electric actuator for a valve includes an actuator mechanism enabling an alternate mechanical operation of the valve.

An electric actuator includes at least one screw mechanism, at least a self-locking mechanism, and at least a motor.

The electric actuator according to the preceding clause, wherein the motor is powered by a battery system and coupled to the at least one screw mechanism, which then provides a linear output to a valve stem actuating a valve open or close.

The electric actuator according any preceding clause, further including a gear train.

The electric actuator according to any preceding clause, further including a self-locking mechanism.

The electric actuator according to any preceding clause, wherein the self-locking mechanism includes an electromagnetic brake or a worm screw or a trapezoidal thread screw.

The electric actuator according to any preceding clause, further including a mechanical override to the self-locking mechanism.

The electric actuator according to any preceding clause, wherein the mechanical override is comprised in a ROV tool.

The electric actuator according to any preceding clause, further including an electrical connection to disengage the self-locking mechanism.

In certain embodiments, a system includes an electric actuator having an actuation stem, a screw assembly, an electric drive, and a lock. The screw assembly is coupled to the actuation stem, wherein the screw assembly includes a male screw portion coupled to a female screw portion. The electric drive is coupled to the screw assembly, wherein the electric drive is configured to move the screw assembly to move the actuation stem. The lock is configured to hold a position of the actuation stem when not driving movement of the actuation stem.

The system of the preceding clause, including a valve assembly coupled to the electric actuator, wherein the actuation stem includes a valve stem coupled to a valve disposed in a valve body of the valve assembly.

The system of any preceding clause, wherein the lock is configured to hold the position of the actuation stem to hold a valve position of the valve.

The system of any preceding clause, wherein the electric actuator includes an override coupled to the screw assembly, and the override is configured to enable an override of the lock to move the screw assembly without the electric drive.

The system of any preceding clause, wherein the override includes a remotely operated vehicle (ROV) override configured to interface with an ROV tool.

The system of any preceding clause, wherein the override and the electric drive are disposed in a series arrangement.

The system of any preceding clause, wherein the override and the electric drive are disposed in a parallel arrangement.

The system of any preceding clause, wherein the override and the electric drive are coupled to a first gear assembly, wherein the first gear assembly is coupled to the screw assembly.

The system of any preceding clause, wherein the first gear assembly includes a worm gear engaged with a worm screw, and the override and the electric drive are separately coupled to the worm screw.

The system of any preceding clause, wherein an engagement between the worm gear and the worm screw of the first gear assembly functions as the first lock.

The system of any preceding clause, including a second gear assembly disposed between the first gear assembly and the override.

The system of any preceding clause, wherein the second gear assembly includes one or more planetary gear assemblies.

The system of any preceding clause, including a third gear assembly disposed between the first and second gear assemblies, wherein the third gear assembly includes a plurality of bevel gears engaged with one another.

The system of any preceding clause, including an energy storage unit coupled to the electric drive.

The system of any preceding clause, wherein the lock includes an electric lock, an electromagnetic lock, a worm screw, a trapezoidal screw, or a combination thereof.

The system of any preceding clause, wherein the electric actuator excludes a spring configured to bias the actuation stem.

In certain embodiments, a method includes powering an electric drive to move a screw assembly to move an actuation stem of an electric actuator, wherein the screw assembly includes a male screw portion coupled to a female screw portion, and the screw assembly is coupled to the actuation stem. The method also includes holding, via a lock, a position of the actuation stem when not driving movement of the actuation stem.

The method of the preceding clause, including actuating a valve of a valve assembly via movement of the actuation stem by the electric actuator, wherein power the electric drive includes supplying the power from an energy storage unit.

The method of any preceding clause, including overriding the lock, via an override, and moving the screw assembly to move the actuation stem without the electric drive.

In certain embodiments, a system includes a valve assembly having a valve disposed in a valve body, and an electric actuator including an actuation stem, a screw assembly, an electric drive, a lock, and an override. The actuation stem is coupled to the valve. The screw assembly is coupled to the actuation stem, wherein the screw assembly includes a male screw portion coupled to a female screw portion. The electric drive is coupled to the screw assembly, wherein the electric drive is configured to move the screw assembly to move the actuation stem. The lock is configured to hold a position of the actuation stem when not driving movement of the actuation stem. The override is coupled to the screw assembly, wherein the override is configured to enable an override of the lock to move the screw assembly without the electric drive, and the override includes a remotely operated vehicle (ROV) override.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    an electric actuator, comprising:
        an actuation stem;
        a screw assembly coupled to the actuation stem, wherein the screw assembly comprises a male screw portion coupled to a female screw portion;
        an electric drive coupled to the screw assembly, wherein the electric drive is configured to move the screw assembly to move the actuation stem;
        a lock configured to hold a position of the actuation stem when not driving movement of the actuation stem; and
        an override coupled to the screw assembly and configured to enable an override of the lock to move the screw assembly without the electric drive,
        wherein the override and the electric drive are disposed in a series arrangement,
        wherein the override and the electric drive are coupled to a first gear assembly, the first gear assembly being coupled to the screw assembly,
        wherein the first gear assembly comprises a worm gear engaged with a worm screw, and the override and the electric drive are separately coupled to the worm screw, and
        wherein an engagement between the worm gear and the worm screw of the first gear assembly functions as the lock.

2. The system of claim 1, comprising a valve assembly coupled to the electric actuator, wherein the actuation stem comprises a valve stem coupled to a valve disposed in a valve body of the valve assembly.

3. The system of claim 2, wherein the lock is configured to hold the position of the actuation stem to hold a valve position of the valve.

4. The system of claim 1, wherein the override comprises a remotely operated vehicle (ROV) override configured to interface with an ROV tool.

5. The system of claim 1, wherein the electric actuator comprises a second gear assembly disposed between the first gear assembly and the override, wherein the second gear assembly comprises one or more planetary gear assemblies.

6. The system of claim 5, wherein the electric actuator comprises a third gear assembly disposed between the first and second gear assemblies, wherein the third gear assembly comprises a plurality of bevel gears engaged with one another.

7. The system of claim 1, wherein the electric drive is retrievable via a remotely operated vehicle (ROV).

8. The system of claim 1, wherein the electric actuator comprises an energy storage unit coupled to the electric drive.

9. The system of claim 1, wherein the first gear assembly comprises a second lock, wherein the second lock comprises an electric lock, an electromagnetic lock, a mechanical lock, a fluid lock, or a combination thereof.

10. The system of claim 1, wherein the electric actuator excludes a spring configured to bias the actuation stem.

11. A method comprising:
    powering an electric drive to move a screw assembly to move an actuation stem of an electric actuator, wherein the screw assembly comprises a male screw portion coupled to a female screw portion, and the screw assembly is coupled to the actuation stem;
    holding, via a lock, a position of the actuation stem when not driving movement of the actuation stem; and
    overriding the lock, via an override, and moving the screw assembly to move the actuation stem without the electric drive,
    wherein the override and the electric drive are disposed in a series arrangement,
    wherein the override and the electric drive are coupled to a first gear assembly, the first gear assembly being coupled to the screw assembly,
    wherein the first gear assembly comprises a worm gear engaged with a worm screw, and the override and the electric drive are separately coupled to the worm screw, and
    wherein an engagement between the worm gear and the worm screw of the first gear assembly functions as the lock.

12. The method of claim 11, comprising actuating a valve of a valve assembly via movement of the actuation stem by the electric actuator, wherein powering the electric drive comprises supplying the power from an energy storage unit.

13. A system comprising:

a valve assembly having a valve disposed in a valve body; and an electric actuator, comprising:

an actuation stem coupled to the valve;

a screw assembly coupled to the actuation stem, wherein the screw assembly comprises a male screw portion coupled to a female screw portion;

an electric drive coupled to the screw assembly, wherein the electric drive is configured to move the screw assembly to move the actuation stem;

a lock configured to hold a position of the actuation stem when not driving movement of the actuation stem; and an override coupled to the screw assembly, wherein the override is configured to enable an override of the lock to move the screw assembly without the electric drive, and the override comprises a remotely operated vehicle (ROV) override, wherein the override and the electric drive are disposed in a series arrangement, wherein the override and the electric drive are coupled to a first gear assembly, the first gear assembly being coupled to the screw assembly, wherein the first gear assembly comprises a worm gear engaged with a worm screw, and the override and the electric drive are separately coupled to the worm screw, and wherein an engagement between the worm gear and the worm screw of the first gear assembly functions as the lock.

14. The system of claim 13, wherein the lock is configured to hold the position of the actuation stem to hold a valve position of the valve.

15. The system of claim 13, wherein the ROV override is configured to interface with an ROV tool.

16. The system of claim 13, wherein the electric actuator comprises a second gear assembly disposed between the first gear assembly and the override, wherein the second gear assembly comprises one or more planetary gear assemblies.

17. The system of claim 16, wherein the electric actuator comprises a third gear assembly disposed between the first and second gear assemblies, wherein the third gear assembly comprises a plurality of bevel gears engaged with one another.

18. The system of claim 13, wherein the electric drive is retrievable via a remotely operated vehicle (ROV).

19. The system of claim 13, wherein the electric actuator comprises an energy storage unit coupled to the electric drive.

20. The system of claim 13, wherein the electric actuator excludes a spring configured to bias the actuation stem.

* * * * *